US012512597B1

(12) United States Patent
Fink et al.

(10) Patent No.: US 12,512,597 B1
(45) Date of Patent: Dec. 30, 2025

(54) MINIATURIZED POLARIZATION-DIVERSE RADIO-FREQUENCY IDENTIFICATION (RFID) ANTENNA

(71) Applicant: United States of America as represented by the Administrator of NASA, Washington, DC (US)

(72) Inventors: Patrick Fink, Houston, TX (US); Gregory Lin, Houston, TX (US)

(73) Assignee: United States of America represented by the Administrator of NASA, Washington, DC (US)

(*) Notice: Subject to any disclaimer, the term of this patent is extended or adjusted under 35 U.S.C. 154(b) by 310 days.

(21) Appl. No.: 18/296,645

(22) Filed: Apr. 6, 2023

(51) Int. Cl.
*H01Q 13/10* (2006.01)
*H01Q 1/22* (2006.01)
*H01Q 9/04* (2006.01)

(52) U.S. Cl.
CPC ......... *H01Q 13/106* (2013.01); *H01Q 1/2208* (2013.01); *H01Q 9/0407* (2013.01)

(58) Field of Classification Search
None
See application file for complete search history.

(56) References Cited

U.S. PATENT DOCUMENTS 3,665,480 A 5/1972 Fassett
4,903,033 A 2/1990 Tsao et al.
5,241,321 A 8/1993 Tsao
6,342,866 B1 1/2002 Ho et al.
6,888,459 B2 5/2005 Stilp
7,187,337 B2 3/2007 Aikawa et al.
7,495,544 B2 2/2009 Stilp
7,589,673 B2 * 9/2009 Kuramoto ............ H01Q 9/0421 343/702
7,667,575 B2 2/2010 Husak et al.
(Continued)

FOREIGN PATENT DOCUMENTS

CA 2267536 A1 * 10/1999 ............. H01Q 5/364
CN 1459138 A * 11/2003 ............. H01Q 1/242
(Continued)

OTHER PUBLICATIONS

S. Beldi, A. Fechichi, A. Gharsallah, and Tan Phu Vuong, Miniaturized Nosted-Slot Antenna Tag RFID With Slot Technique, Microwave and Optical Technology Letters, Aug. 2014, pp. 1898-1903, vol. 56, No. 8, Wiley Periodicals, Inc.
(Continued)

*Primary Examiner* — Dameon E Levi
*Assistant Examiner* — Anh N Ho
(74) *Attorney, Agent, or Firm* — Kurt G. Hammerle; David G. Matthews

(57) ABSTRACT

A radio-frequency identification (RFID) antenna, per an implementation, includes a substrate, a metalized pattern, one or more slots, a ground plane, a shorting strip, and one or more feed lines. The metalized pattern has microstrip segments and a lateral microstrip. The slot(s) is situated between the microstrip segments. The ground plane extends from the substrate via the shorting strip. The feed line(s) resides on a surface of the substrate. In a slot mode of use of the RFID antenna, an electromagnetic field radiates from the slot. In a patch mode of use of the RFID antenna, an electromagnetic field radiates adjacent ends of the metalized pattern.

18 Claims, 13 Drawing Sheets

(56) References Cited

U.S. PATENT DOCUMENTS

| | | | | |
|---|---|---|---|---|
| 7,844,242 | B2 | 11/2010 | Rofougaran et al. | |
| 8,629,812 | B2 | 1/2014 | Jaffri et al. | |
| 8,659,494 | B2 | 2/2014 | Bellows | |
| 8,792,848 | B2 | 7/2014 | Rofougaran et al. | |
| 8,847,832 | B2 | 9/2014 | Parsche et al. | |
| 10,025,960 | B1 | 7/2018 | Fink et al. | |
| 10,121,030 | B1 | 11/2018 | Fink et al. | |
| 10,347,984 | B2 * | 7/2019 | Le Thuc | H01Q 1/521 |
| 10,552,651 | B1 | 2/2020 | Fink et al. | |
| 10,567,146 | B1 | 2/2020 | Fink et al. | |
| 2008/0079542 | A1 | 4/2008 | Rofougaran | |

FOREIGN PATENT DOCUMENTS

| | | | | | |
|---|---|---|---|---|---|
| CN | 103765677 | A | * | 4/2014 | H01Q 5/371 |
| JP | 5505521 | B2 | * | 5/2014 | H01Q 1/243 |
| KR | 20150052172 | A | * | 5/2015 | |
| TW | I355110 | B | | 12/2011 | |
| WO | WO03094293 | A1 | | 11/2003 | |
| WO | WO2008027650 | A2 | | 3/2008 | |

OTHER PUBLICATIONS

Nicholas P. Lawrence, Brian W.-H. NG1, (Member, IEEE), Hedley J. Hansen, (Member, IEEE), Derek Abbott, (Fellow IEEE), 5G Terrestrial Networks: Mobility and Coverage-Solution in Three Dimensions, IEEE Access, Apr. 17, 2017, pp. 8064-8093, vol. 5, IEEE Adelaide, Australia.

Marwa Zamali, Lotfi Osman, Hedi Raggad, and Mohamed Latrach, A Compact Wideband Slot Antenna for Universal UHF RFID Reader, Progress In Electromagnetics Research Letters, 2018, pp. 65-71, vol. 78, Angers, France.

Jian Dong, Chang Ding and Jinjun Mo, A Low-Profile Wideband Linear-to-Circular Polarization Conversion Slot Antenna Using Metasurface, materials Article, Mar. 5, 2020, 12 pages, Basel, Switzerland.

* cited by examiner

MINIATURIZED POLARIZATION-DIVERSE RADIO-FREQUENCY IDENTIFICATION (RFID) ANTENNA

STATEMENT OF GOVERNMENT INTEREST

The embodiments described herein may be manufactured and used by or for the Government of the United States of America without payment of any royalties thereon or therefor.

TECHNICAL FIELD

The present disclosure relates generally to radio-frequency identification (RFID) technologies and, more particularly, to antennas employed in RFID systems.

BACKGROUND

Radio-frequency identification (RFID) systems are often employed to detect the presence of RFID tags carried by objects and, in some cases, to identify the location of the tagged objects for tracking purposes. Use of RFID systems is widespread. The systems can be used in a warehouse, factory, and retail setting to keep track of inventory, as well as in medical, automotive, aviation, agricultural, restaurant, and other applications, among many other possibilities.

Antennas radiate signals amid the discovery of RFID tags and are typically connected to RFID readers. Antennas can establish interrogation zones for interrogating any RFID tags occupied therein and can receive signals from RFID tags in response. Antennas can be characterized by their polarization type. Antenna polarization, in general, refers to the direction in which an electromagnetic field oscillates and is transmitted from the accompanying antenna. Polarization can be linear, for example, with an electromagnetic field emanating in a horizontal orientation, a vertical orientation, or in another orientation that is an amalgamation of the horizontal and vertical orientations.

SUMMARY

In an embodiment, a radio-frequency identification (RFID) antenna may include a substrate, a first microstrip segment, a second microstrip segment, one or more slots, a ground plane, a shorting strip, and one or more feed lines. The first microstrip segment resides on the substrate. The second microstrip segment also resides on the substrate. The first and second microstrip segments are adjoined with each other by a lateral microstrip near first ends of the first and second microstrip segments. The first and second microstrip segments lack adjoinment at second ends thereof. The slot(s) is situated between the first and second microstrip segments. The slot(s) spans from the adjoined first ends of the first and second microstrip segments to the second ends of the first and second microstrip segments. The shorting strip extends between the lateral microstrip and the ground plane. The one or more feed lines reside on a surface of the substrate.

In another embodiment, a radio-frequency identification (RFID) antenna may include a substrate, a metalized pattern, and a ground plane. The metalized pattern is carried by the substrate. The metalized pattern has a first microstrip segment, a second microstrip segment, and a lateral microstrip. The first microstrip segment spans lengthwise between a first end and a second end, and the second microstrip segment likewise spans lengthwise between a first end and a second end. The lateral microstrip adjoins the first and second microstrip segments together. The metalized pattern also has one or more slots. The slot(s) is situated between the first microstrip segment and the second microstrip segment. The slot(s) has a lengthwise extent that spans between the first and second ends of the first and second microstrip segments. The ground plane extends from the substrate by way of a shorting strip. The shorting strip connects the metalized pattern to the ground plane. A clearance is established between the ground plane and the second ends of the first and second microstrip segments. The clearance has a lateral extent. The lengthwise extent of the slot(s) is arranged generally transverse to the clearance's lateral extent. In a first mode of use, a first electromagnetic field is radiated from the slot(s), and in a second mode of use, a second electromagnetic field is radiated near the clearance.

In yet another embodiment, a radio-frequency identification (RFID) antenna may include a substrate, a first microstrip segment, a second microstrip segment, a lateral microstrip, a third microstrip segment, a first slot, a first open end, a second slot, a second open end, a ground plane, a shorting strip, a first feed line, and a second feed line. The first microstrip segment is carried by the substrate, the second microstrip segment is likewise carried by the substrate, and the third microstrip segment is carried by the substrate. The lateral microstrip is carried by the substrate and couples the first microstrip segment and second microstrip segment to each other. The first slot is situated between the first and third microstrip segments. The first open end is established by way of the first slot and between terminal ends of the first and third microstrip segments. The second slot is situated between the second and third microstrip segments. The second open end is established by way of the second slot and between terminal ends of the second and third microstrip segments. The shorting strip extends between the lateral microstrip and the ground plane. The first feed line resides at a bottom surface of the substrate and terminates at a capacitor. The second feed line resides at a top surface of the substrate. In a first mode of use, a first electromagnetic field radiates from the first slot and radiates from the second slot. In a second mode of use, a second electromagnetic field radiates near the terminal ends of the first, second, and third microstrip segments.

BRIEF DESCRIPTION OF THE DRAWINGS

One or more aspects of the disclosure will hereinafter be described in conjunction with the appended drawings, wherein like designations denote like elements, and wherein.

DETAILED DESCRIPTION

Figure 1:
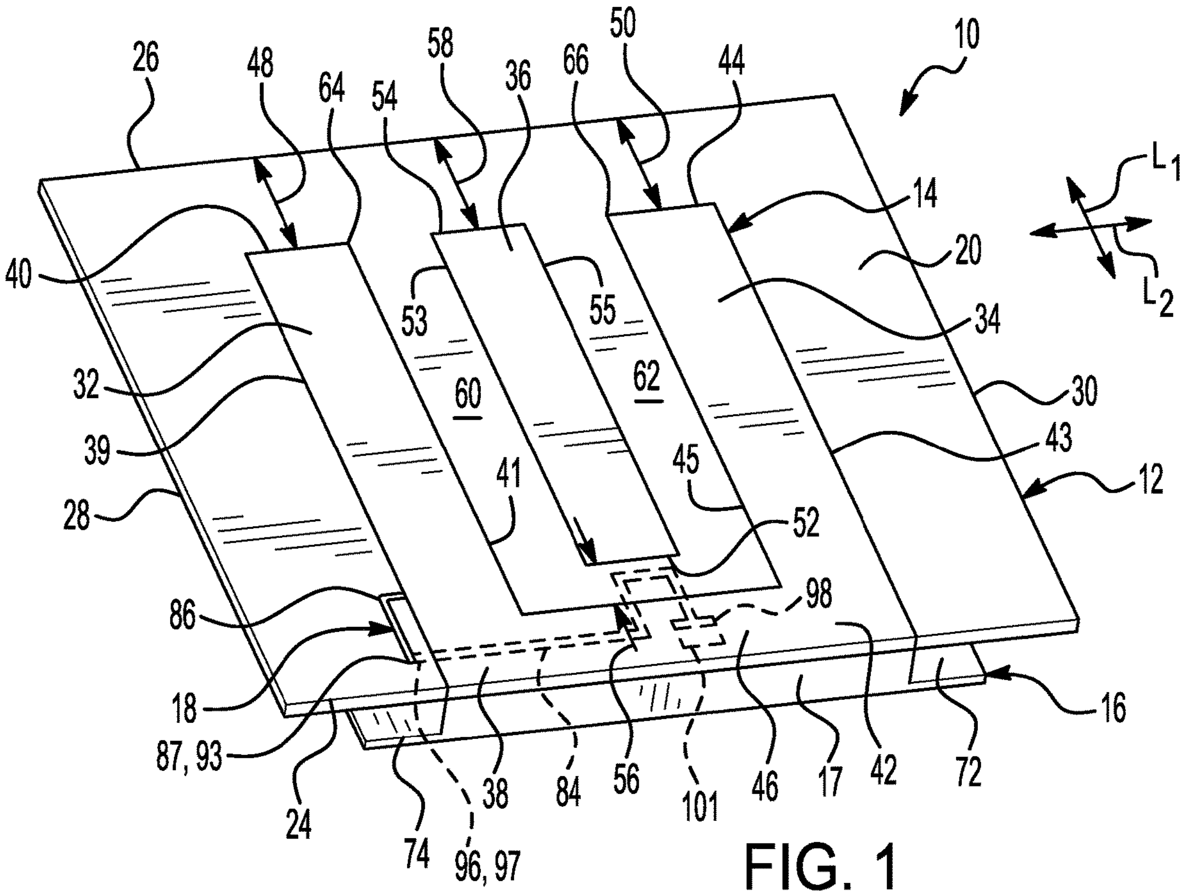
FIG. 1 is a perspective top view of an embodiment of a radio-frequency identification (RFID) antenna.

Referring generally to the drawings, at least some embodiments of a radio-frequency identification (RFID) antenna 10 furnish diversity in polarization for reading RFID tags exhibiting varied positions and orientations amid interrogation.

Electromagnetic fields may emanate from the RFID antenna 10 with polarizations of high aspect ratio (e.g., nearly linear) which change based upon a channel frequency, according to some embodiments. Moreover, the RFID antenna 10 can provide such polarization diversity, per some embodiments, in a form factor that is minimal and small in physical size, particularly when compared to RFID antennas providing diversified polarization as understood in the prior art. In one particular embodiment described herein, the size of the RFID antenna 10 is prescribed in dimension by an approximate one-quarter (¼) of an operating wavelength. Small-sized RFID antennas—like certain embodiments of the RFID antenna 10—can facilitate dissemination of RF signals to vast regions in a particular application, such as open-air regions, closed regions (e.g., drawers, enclosures), and/or, more generally, regions of quite small confines, such as those found in spacecraft. Furthermore, RFID antennas of small size can also have reduced mass and can be more readily equipped in handheld readers, portable devices, and drones, as well as other installations sensitive to size and weight and subject to small packaging demands. Still, a particular embodiment of the RFID antenna 10 may exhibit only one, or a combination of, the advancements set forth herein, none of the advancements, or other advancements not mentioned herein.

The RFID antenna 10 is employable in RFID systems used in many applications including warehouse settings, factory settings, and retail settings, as well as in medical, automotive, aviation, agricultural, restaurant, and parking applications, among others. The RFID antenna 10 may also find ready use and installation in space vehicle and spacecraft applications.

The RFID antenna 10 radiates wireless signals in the form of electromagnetic waves amid its use in a RFID system. The RFID antenna 10 establishes an interrogation zone for interrogating any RFID tags occupied therein and can receive RF signals from the RFID tags in response. The RFID system may include other components in its setup, including an RFID reader and multiple RFID antennas spanning therefrom via multiplexers. The RFID reader, in general, provides RF signaling to the RFID antennas in the system and processes the received RF signals in order to determine the location of any detected RFID tags, for example, among other possible processing steps that can take place and possible determinations that can be made. The RFID tags subject to interrogation, detection, and location can be the passive type of tag or the active type. Depending on the type, the RFID tags can be composed of a substrate, an integrated circuit, an antenna, a battery, or a combination thereof, among other components. Response information from the RFID tags when interrogated can include an identifier and/or the identity of the object tagged and its location, as examples. The RFID antenna 10 can have various designs, constructions, and components in different embodiments depending upon—among other potential influences—its intended application of use and area of intended coverage for RFID tag interrogation. The drawings present several embodiments of the RFID antenna 10. In FIGS. 1-8, a first embodiment of the RFID antenna 10 includes a substrate 12, a metalized pattern 14, a ground plane 16, a shorting strip 17, and one or more feed lines 18. In other embodiments, the RFID antenna 10 could have more, less, and/or different components in other embodiments.

Figure 2:
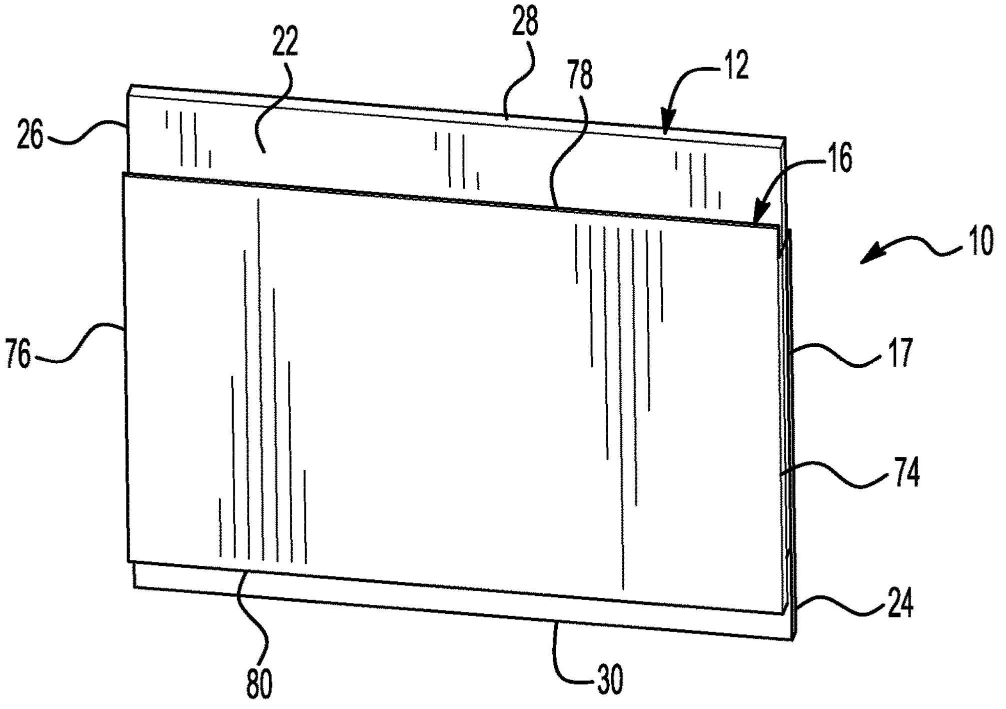
FIG. 2 is a perspective bottom view of the RFID antenna of FIG. 1.
Figure 3:
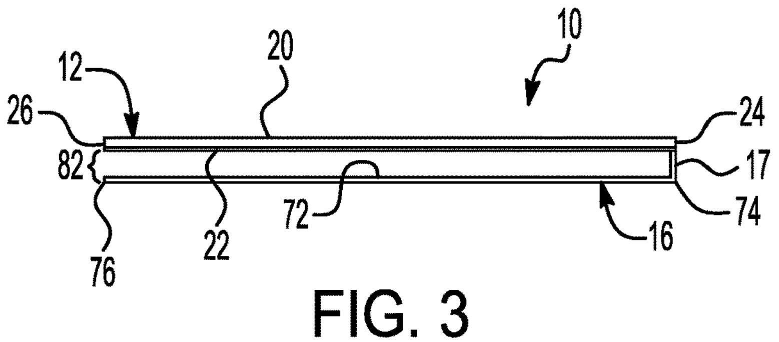
FIG. 3 is a side view of the RFID antenna of FIG. 1.

The substrate 12 constitutes a main structural body of the RFID antenna 10 and can provide support for other components of the RFID antenna 10. With particular reference to FIGS. 1-3, the metalized pattern 14 and feed line(s) 18 are carried by the substrate 12 in this embodiment, and the ground plane 16 extends from the substrate 12. The substrate 12 can be in the form of an insulating dielectric substrate, such as a printed circuit board, and can be in the form of a laminate. In general, the substrate 12 can have a rectangular or square-like overall shape, as depicted, and has a top surface 20 and a bottom surface 22. The substrate 12 has a longitudinal extent spanning between a first end 24 and a second end 26. The first end 24 establishes a proximal end of the substrate 12, and the second end 26 establishes a distal and free end of the substrate 12. In a similar manner, the substrate 12 has a lateral extent spanning between a first side 28 and a second side 30. For demonstrative purposes, a longitudinal direction $L_1$ and a lateral direction $L_2$ are presented in FIGS. 1, 4, and 6.

The metalized pattern 14 provides an upper boundary condition that serves to establish one or more slots that resonate at one end of an operational frequency bandwidth and a quarter-wave (¼) microstrip patch structure that resonates at an opposite end of the operational frequency bandwidth. The metalized pattern 14 facilitates a specific distribution of electromagnetic fields, as described below in greater detail. In general, the metalized pattern 14 can be in the form of a metal foil and can be composed of a high conductivity metal such as copper. The metalized pattern 14 is carried by the substrate 12 and resides on the substrate's top surface 20. In the embodiments presented by the drawings, the metalized pattern 14 exhibits a two-dimensional and generally planar configuration. It can be fabricated by various techniques such as photolithography. The metalized pattern 14 can have varied geometric patterns in different embodiments. In the first embodiment, and with particular reference to FIG. 1, the metalized pattern 14 has a first microstrip segment 32, a second microstrip segment 34, and a third microstrip segment 36. The first, second, and third microstrip segments 32, 34, 36 have generally rectangular shapes, are carried by the substrate 12, and reside on the substrate's top surface 20. The microstrip segments 32, 34, 36 can resemble strips or lines in some embodiments. The first, second, and third microstrip segments 32, 34, 36 have lengthwise extents in-line with the longitudinal extent of the substrate 12 and in-line with the longitudinal direction $L_1$, and they are arranged in a general parallel relationship relative to one another. In this embodiment, and with continued reference to FIG. 1, the first microstrip segment 32 constitutes a near strip with respect to the introduction of RF signals via the feed line(s) 18, while the second microstrip segment 34 constitutes a far strip with respect to the introduced RF signals. As depicted, the first and second microstrip segments 32, 34 are coextensive. In the embodiment shown in FIG. 1, the first and second microstrip segments 32, 34 can have an electrical length in the longitudinal direction $L_1$ that is approximately one-quarter (¼) of an operating wavelength in dimension. In other embodiments, the first and second microstrip segments could have other length dimensions in other embodiments. The first microstrip segment 32 has a first lengthwise and longitudinal extent that spans between a first end 38 and a second end 40, and segment 32 has a first widthwise and lateral extent that spans between a first side 39 and a second side 41. The first end 38 is a proximal end, and the second end 40 is a distal and terminal end. The first side 39 faces laterally outboard relative to the metalized pattern 14, and the second side 41 faces laterally inboard relative to the metalized pattern 14. In a similar manner, the second microstrip segment 34 has a second lengthwise and longitudinal extent that spans between a first end 42 and a second end 44, and segment 34 has a second widthwise and lateral extent that spans between a first side 43 and a second side 45. The first end 42 is a proximal end, and the second end 44 is a distal and terminal end. The first side 43 faces laterally outboard relative to the metalized pattern 14, and the second side 45 faces laterally inboard relative to the metalized pattern 14.

The first and second microstrip segments 32, 34 are adjoined and coupled together. In the embodiment here, the coupling is at the first ends 38, 42 and is established by a lateral microstrip 46 that extends between the first and second microstrip segments 32, 34. The lateral microstrip 46 can be considered a part of the metalized pattern 14. The lateral microstrip 46 spans transversely between the first and second microstrip segments 32 and 34, has a generally rectangular shape, and has a lengthwise extent arranged generally orthogonal to the first and second lengthwise extents of the first and second microstrip segments 32, 34. It can resemble a strip or line in some embodiments. Further, the lateral microstrip 46 resides generally at the first end 24 of the substrate 12 and establishes a closed end near the first ends 38, 42 of the first and second microstrip segments 32, 34. Together, the first and second microstrip segments 32, 34 and the lateral microstrip 46 are integral with one another and resemble an overall U-shape.

Unlike at the first ends 38, 42, the first and second microstrip segments 32, 34 are not adjoined at the second ends 40, 44; rather, segments 32, 34 lack an immediate and direct adjoinment and coupling thereat. In the embodiment referring to FIG. 1, the second ends 40, 44 are co-terminate relative to each other. An open end is provided at the second ends 40, 44 of the first and second microstrip segments 32, 34. The second ends 40, 44 are spaced laterally apart. By way of the open end, an open circuit is established at the second ends 40, 44 in the metalized pattern 14. Further, in one embodiment the second end 40 of the first microstrip segment 32 terminates short of the second and free end 26 of the substrate 12, or in another embodiment the second end 40 could terminate at the free end 26. A first longitudinal spacing 48 is hence in one embodiment defined and situated between the second end 40 and the free end 26. The first longitudinal spacing 48 is an expanse and area of the substrate 12 that is devoid of the metalized pattern 14. High conductivity metal is absent at the first longitudinal spacing 48. In a similar way, in one embodiment the second end 44 of the second microstrip segment 34 terminates short of the free end 26 of the substrate 12, or in another embodiment the second end 44 could terminate at the free end 26. A second longitudinal spacing 50 is hence in one embodiment defined and situated between the second end 44 and the free end 26. The second longitudinal spacing 50 is an expanse and area of the substrate 12 that is devoid of the metalized pattern 14. High conductivity metal is absent at the second longitudinal spacing 50. Moreover, as demonstrated in FIG. 1, the first and second longitudinal spacings 48, 50 span laterally across the widthwise extents of the respective first and second microstrip segments 32, 34.

In this embodiment, the third microstrip segment 36 is located in-between the first and second microstrip segments 32, 34. As illustrated in FIG. 1, the third microstrip segment 36 is spaced from the first and second microstrip segments 32, 34 and from the lateral microstrip 46, leaving areas of substrate 12 positioned therebetween. The third microstrip segment 36 is positioned laterally midway between the first and second microstrip segments 32, 34 in this embodiment. The third microstrip segment 36 is not adjoined with the first and second microstrip segments 32, 34—nor with the lateral microstrip 46—and rather lacks adjoinment and coupling with the segments 32, 34. Further, the third microstrip segment 36 has a third lengthwise and longitudinal extent that spans between a first end 52 and a second end 54, and segment 36 has a third widthwise and lateral extent that spans between a first side 53 and a second side 55. The first end 52 is a proximal end, and the second end 54 is a distal and terminal end. The first side 53 confronts the second side 41 of the first microstrip segment 32 across a lateral spacing therebetween, and likewise the second side 55 confronts the second side 45 of the second microstrip segment 34 across a lateral spacing therebetween. The first end 52 is positioned a distance from the lateral microstrip 46 in the longitudinal direction $L_1$. A longitudinal third spacing 56 is hence defined and situated between the first end 52 and the lateral microstrip 46. The longitudinal third spacing 56 is an expanse and area of the substrate 12 that is devoid of the metalized pattern 14. High conductivity metal is absent at the longitudinal third spacing 56. In a similar manner, in one embodiment the second end 54 of the third microstrip segment 36 terminates short of the free end 26 of the substrate 12, or in another embodiment the segment 36 could terminate at the free end 26. A fourth longitudinal spacing 58 is hence defined and situated between the second end 54 and the free end 26. The fourth longitudinal spacing 58 is an expanse and area of the substrate 12 that is devoid of the metalized pattern 14. High conductivity metal is absent at the fourth longitudinal spacing 58. Moreover, the longitudinal spacings 56, 58 span laterally across the third widthwise extent of the third microstrip segment 36.

Figure 6:
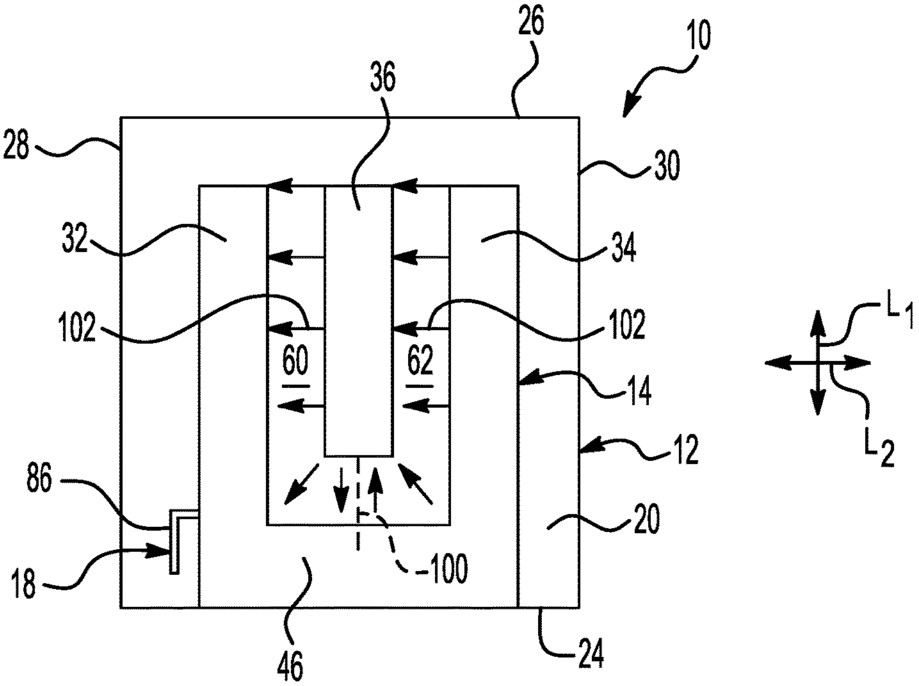
FIG. 6 shows a top surface of the substrate of the RFID antenna, depicting an electric field associated with a first electromagnetic field in a first mode of use of the RFID antenna.
Figure 7:
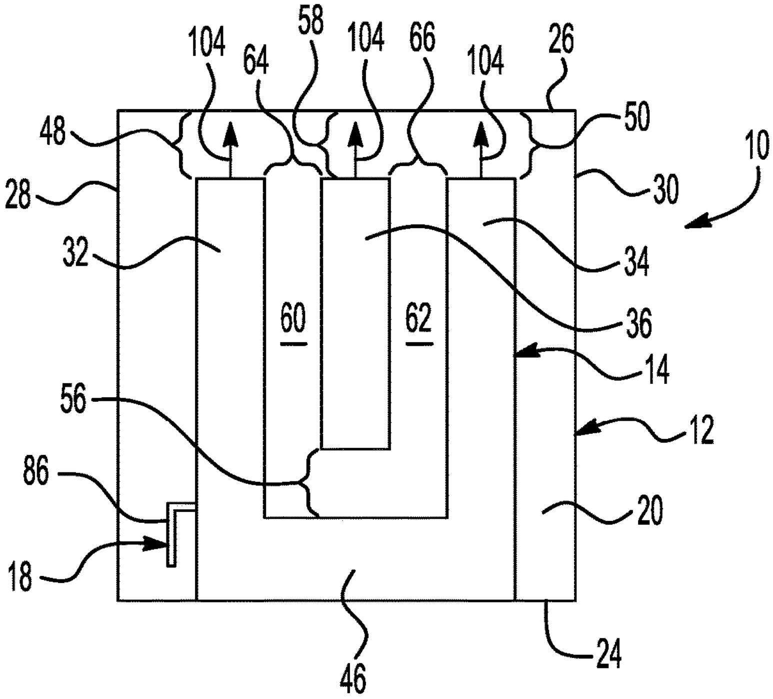
FIG. 7 shows the top surface of the substrate of the RFID antenna, depicting an electric field associated with a second electromagnetic field in a second mode of use of the RFID antenna.

With reference now to FIGS. 1, 6, and 7, the metalized pattern 14 also has a geometric pattern in the first embodiment that provides a first slot 60 and a second slot 62 for radiating electromagnetic waves amid use of the RFID antenna 10. The first and second slots 60, 62 reside at the top surface 20 of the substrate 12. The first and second slots 60, 62 are expanses and areas of the substrate 12 that are devoid of high conductivity metal. The first slot 60 is established, in part, via the lateral spacing provided between the first microstrip segment 32 and the third microstrip segment 36. Likewise, the second slot 62 is established, in part, via the lateral spacing provided between the second microstrip segment 34 and the third microstrip segment 36. The first and second slots 60, 62 separate the first, second, and third microstrip segments 32, 34, 36 from one another in the lateral direction $L_2$. The first and second slots 60, 62 are adjoined by the longitudinal third spacing 56 in the lateral direction $L_2$. The expanses and areas of the substrate 12 that define the first and second slots 60, 62 and the longitudinal third spacing 56 resemble an overall U-shape and, in this sense, constitute a single U-shaped slot. According to an embodiment, lateral widths of the first and second slots 60, 62 are approximately equal with respect to each other, and a longitudinal width of the longitudinal third spacing 56 is approximately equal to the lateral widths of the first and second slots 60, 62. In the longitudinal direction $L_1$, the first slot 60 has a first lengthwise extent that spans approximately between the first end 38 and the second end 40 of the first microstrip segment 32. Also, in the longitudinal direction $L_1$, the second slot 62 has a second lengthwise extent that spans approximately between the first end 42 and second end 44 of the second microstrip segment 34.

Furthermore, a first open end 64 is established by way of the first slot 60 at the second ends 40, 54, and a second open end 66 is established by way of the second slot 62 at the second ends 44, 54.

The ground plane 16 interacts with the metalized pattern 14 to radiate electromagnetic waves amid use of the RFID antenna 10. Referring to FIGS. 1-3, in this embodiment the ground plane 16 is connected to the metalized pattern 14 by the shorting strip 17 at the substrate's first end 24 and adjacent the first ends 38, 42 of the first and second microstrip segments 32, 34. Further, the ground plane 16 is connected to the lateral microstrip 46 via the shorting strip 17. In general, the ground plane 16 and the shorting strip 17 can be composed entirely of a high conductivity metal such as a copper metal. The ground plane 16 extends perpendicularly from the shorting strip 17. The ground plane 16 and shorting strip 17 can each have a rectangular or square-like overall shape, and each can exhibit a two-dimensional and generally planar configuration. The shorting strip 17 extends directly from the substrate's first end 24 and serves to distance the ground plane 16 from the substrate 12. The shorting strip 17 extends between, and electrically connects, the lateral microstrip 46 and the ground plane 16. Short-circuiting occurs by way of the shorting strip 17. The first and second microstrip segments 32, 34 are short-circuited at the ground plane 16 via the shorting strip 17. The short circuit is established near the lateral microstrip 46 and at the first end 24 of the substrate 12. As perhaps shown best by FIG. 3, the ground plane 16 is suspended beneath the substrate 12 via the shorting strip 17. The ground plane 16 has a top surface 72 in confrontation with the substrate's bottom surface 22. The ground plane 16 has a longitudinal extent spanning between a first end 74 and a second end 76. The first end 74 constitutes a proximal end of the ground plane 16, and the second end 76 constitutes a distal and terminal end of the ground plane 16. In this embodiment, the overall longitudinal extent of the ground plane 16 is coextensive with the overall longitudinal extent of the substrate 12. Further, the ground plane 16 has a lateral extent spanning between a first side 78 and a second side 80. The overall lateral extent of the ground plane 16 can be reduced or enlarged compared to the overall lateral extent of the substrate, as depicted.

Due to the ground plane's suspension beneath the substrate 12, a clearance 82 is established as an air gap between the ground plane 16 and the substrate 12. With particular reference to FIG. 3, the clearance 82 resides at the confrontation between the top surface 72 of the ground plane 16 and the bottom surface 22 of the substrate 12. While the clearance 82 can span longitudinally and laterally between the confronting top and bottom surfaces 72, 22, it is established locally between the substrate's free end 26 and the ground plane's terminal end 76. At this location, electromagnetic waves associated with an electromagnetic ¼-wave patch mode can radiate between the second ends 40, 44, 54 of the respective microstrip segments and the ground plane 16 directly beneath the second ends 40, 44, 54 with electromagnetic fields fringing outward toward the terminal end 76. At the free end 26 and terminal end 76, the clearance 82 has a lengthwise and lateral extent that spans between the first side 78 and the second side 80. In this embodiment, the lateral extent of the clearance 82 is arranged generally transverse to the first lengthwise extent of the first slot 60 and to the second lengthwise extent of the second slot 62. The lateral extent of the clearance 82 also lies orthogonal relative to the first and second lengthwise extents of the first and second slots 60, 62, according to this embodiment. The clearance 82 is further established between the ground plane 16 and the second ends 40, 44, 54 of the respective microstrip segments.

Figure 4:
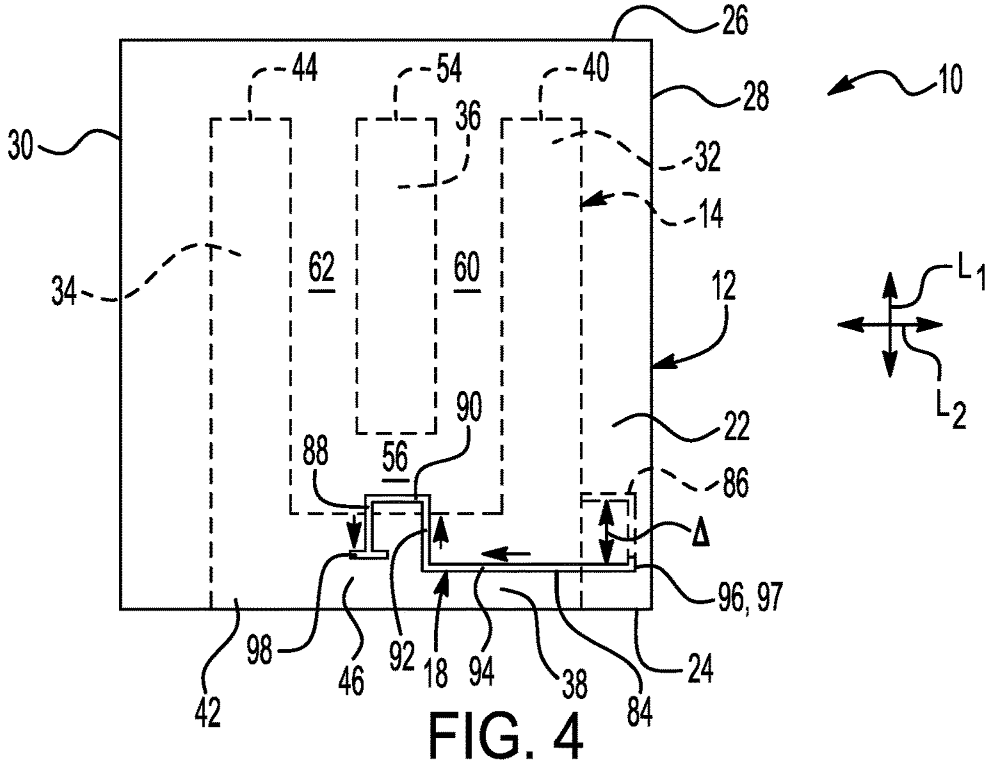
FIG. 4 shows a bottom surface of a substrate of the RFID antenna of FIG. 1.

The feed line(s) 18 serves as a transmission path to facilitate the introduction of RF signals to the RFID antenna 10 and to the metalized pattern 14. In this embodiment, the feed line(s) 18 and its construction and arrangement constitute a feed approach that is capable of exciting multiple modes of use for the RFID antenna 10. The feed line(s) 18 can be in the form of a metal trace or strip and can be composed of a high conductivity metal such as a copper metal. The feed line(s) 18 can have varied designs, constructions, and components in different embodiments that carry out its RF signal feeding functionality. In the first embodiment, and with reference to FIGS. 1, 4, and 5, the feed line(s) 18 includes a first feed line 84 and a second feed line 86. The first feed line 84 is carried by the substrate 12 and resides on the substrate's bottom surface 22. The first feed line 84 can establish an inductive feed at the substrate's bottom surface 22. Because FIG. 1 depicts the top side of the substrate 12, the first feed line 84 is presented in broken lines in the drawing. FIG. 4 has the ground plane 16 removed to show the substrate's bottom surface 22 and the first feed line 84.

Figure 5:
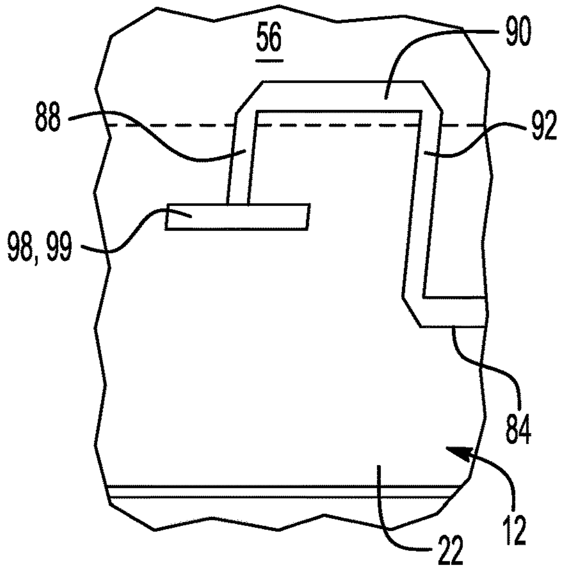
FIG. 5 is an enlarged view of an embodiment of a feed line and a capacitor at the bottom surface of the substrate.

At the bottom surface 22, the first feed line 84 can have varied paths depending in part upon the geometric pattern of the metalized pattern 14. In the embodiment here, the first feed line 84 follows a unified course in which sections of the first feed line 84 overlap the coupling at the first ends 38, 42 of the first and second microstrip segments 32, 34—in this case, the lateral microstrip 46 is overlapped—and the sections further overlap the longitudinal third spacing 56 (the term "overlap" is used in this context to express a lapping-over relationship in a vertical direction that is orthogonal to the longitudinal and lateral directions $L_1$ and $L_2$, respectively, of the substrate's body). A majority of a first section 88 of the first feed line 84 overlaps with the lateral microstrip 46 and can be set in the longitudinal direction $L_1$, as shown. A second section 90 depends from the first section 88, overlaps with the longitudinal third spacing 56, and can be set in the lateral direction $L_2$; still, in other embodiments the second section 90 need not necessarily overlap the longitudinal third spacing 56, and rather could approach the longitudinal third spacing 56 and lie adjacent to the longitudinal third spacing 56 and parallel to it in the lateral direction $L_2$. Further, a third section 92 depends from the second section 90, has a majority overlapping with the lateral microstrip 46, and can be set in the longitudinal direction $L_1$. Parts of the first, second, and third sections 88, 90, 92 that overlap with the longitudinal third spacing 56 constitute a loop of the first feed line 84. The loop can be set longitudinally closer to the lateral microstrip 46 than the third microstrip segment 36 as shown in FIG. 5, or the loop can have another longitudinal location relative to the lateral microstrip 46 and to the third microstrip segment 36. By way of the loop, the first feed line 84 more directly excites the mode of use that is established within the first and second slots 60, 62 and the longitudinal third spacing 56. Lastly, for the embodiment here, a fourth section 94 depends from the third section 92, has a majority overlapping with the lateral microstrip 46, and can be set in the lateral direction $L_2$. The fourth section 94 spans beyond the lateral microstrip 46 and laterally outside of the first side 39 of the first microstrip segment 32, where the fourth section 94 resides at the substrate 12 and lacks overlap with the metalized pattern 14. A terminal end 96 of the first feed line 84 can reside at or adjacent a position of overlap with the second feed line 86, and at the substrate 12 where it lacks overlap with the metalized pattern 14. The terminal end 96 constitutes a first feed connection point 97 of the first feed line 84 that receives connection to, and communication with, a feed connection (introduced below) for exchanging RF signals therebetween.

Figure 19:
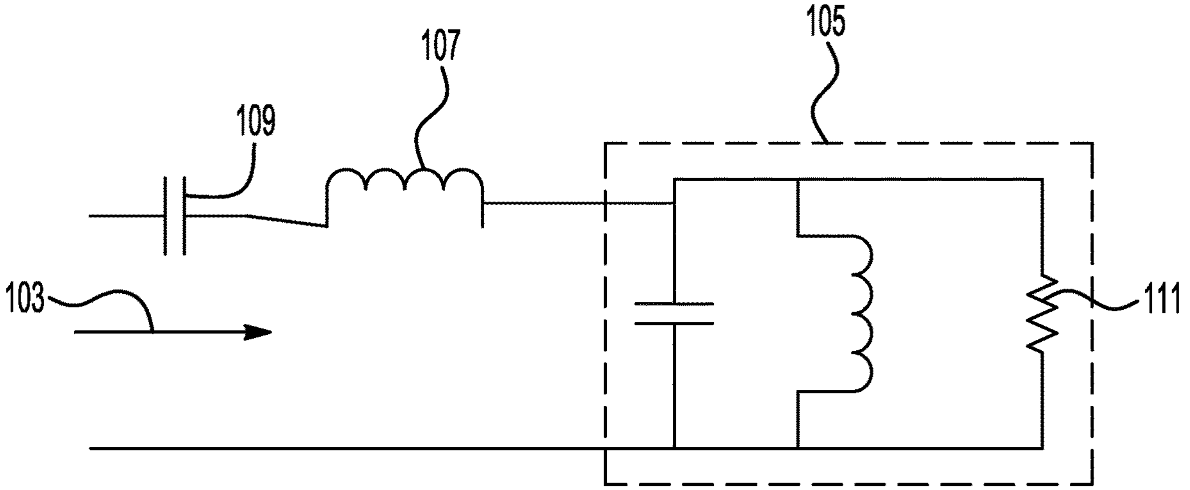
FIG. 19 is a schematic representation of a functional model of the RFID antenna of FIG. 1.

Opposite the terminal end 96, in this embodiment the first feed line 84 terminates at a metallic plate 99 of a capacitor 98. With reference to FIG. 5, the metallic plate 99 of the capacitor 98 and first feed line 84 are electrically and communicably coupled with each other. The capacitor 98 can take different forms in different embodiments. In the embodiment discussed and described here, the capacitor 98 can be in the form of metallic plates with a parallel arrangement, and can be the single narrow metallic plate 99, as depicted, in conjunction with the metal of the lateral microstrip 46 residing on the opposite side of the substrate 12. The metallic plate 99 can be composed of a high conductivity metal such as a copper metal on a printed circuit board, per this embodiment. The metallic plate 99 can capacitively couple to the metalized pattern 14 by way of the substrate 12. The metallic plate 99 can be provided in embodiments in which the desired capacitance to be effected is minimal, but the metallic plate 99 could have more strips and/or could have a greater area in other embodiments for effecting greater capacitance. In this embodiment, the area of the metallic plate 99 is much less than the area of the lateral microstrip 46, as illustrated. The capacitance is dictated primarily by the area of the metallic plate 99, vertical thickness of the substrate 12, and permittivity of the substrate 12. In FIG. 5, the metallic plate 99 is integral with the first feed line 84 and composed of the same metal trace. The capacitor 98 is distanced from the first end 24 of the substrate 12 and from the short circuit established at the ground plane 16 and at the shorting strip 17, and can be located adjacent the first ends 38, 42 of the first and second microstrip segments 32, 34. Further, in the embodiment here, the capacitor 98 overlaps the coupling at the first ends 38, 42 of the first and second microstrip segments 32, 34, respectively, and overlaps with the lateral microstrip 46. In order to facilitate electrical coupling therewith, the capacitor 98 can be located in closer proximity to the second microstrip segment 34 in the lateral direction $L_2$ compared to its proximity to the first microstrip segment 32. The capacitor 98 serves to couple capacitively the signal from the feed connection at the terminal end 96, via the first section 88, to the top surface 20 of the substrate 12. The function of the lateral microstrip 46 as the opposing plate of the capacitor 98 is represented in FIG. 1 by region 101 demarcated by broken lines. The region 101 is physically indistinct from the local metal of the lateral microstrip 46. A purpose of the capacitor 98—in addition to establishing an electromagnetic connection to the metalized pattern 14 at the lateral microstrip 46 without a physical penetration through the substrate 12 (e.g., by way of a via)—is to resonate inductance accrued from one or both of the first and second feed lines 84, 86, as described below.

Where furnished, incorporation of the capacitor 98 with the feed line(s) 18—and particularly with the first feed line 84 at the bottom surface 22—is based at least in part on the functional modeling presented in FIG. 19. In the model, an RF signal input is represented by arrowed line 103. A functional model of the impedance for a mode of use of a patch antenna is represented at broken line boundary 105. Inductance 107 at the loop of the first feed line 84 is depicted, as well as series capacitance 109 of the capacitor 98. FIG. 19 lacks depiction of a load impedance representing a first mode or "slot mode" of use in parallel with a second mode or "patch mode" of use. The inductance 107 and capacitance 109 are designed with sufficient bandwidth (e.g., sufficiently low quality factor, Q) in order to resonate across the entire bandwidth of modes associated with both of the patch mode of use and slot mode of use.

As demonstrated in the model, an improved matching and correspondence between impedances of the patch antenna and the first feed line 84 is effected with the capacitor 98, according to this embodiment. Moreover, the inductance 107 can be increased, per an embodiment, by increasing the length of the fourth section 94 of the first feed line 84 that spans beyond the lateral microstrip 46 and laterally outside of the first side 39 of the first microstrip segment 32. At portions and sections of the first feed line 84 that overlap the lateral microstrip 46, the first feed line 84 can behave as a microstrip line over a ground plane. In a similar manner, the second feed line 86 can be altered to adjust the inductance 107, per an embodiment. The design freedoms to modify the capacitance 109 by way of the capacitor 98 and the inductance 107 by increasing the length of the first and/or second feed lines 84, 86 at locations where the first and/or second feed line 84, 86 lack overlap with the lateral microstrip 46—in addition to employing known transmission line theory applied to sections of the first feed line 84 that overlap the lateral microstrip 46—allow for optimization of the impedance at the terminal end 96. Power transfer to a resistor 111, representing radiated power, is hence suitably provided. Still, in other embodiments the capacitor 98 can be absent.

The second feed line 86 is carried by the substrate 12 and resides on the substrate's top surface 20. Because FIG. 4 depicts the bottom side of the substrate 12, the second feed line 86 is presented in broken lines in the drawing. The second feed line 86 can establish an inductive feed at the substrate's top surface 20. At the top surface 20, the second feed line 86 can have varied paths depending in part upon the geometric pattern of the metalized pattern 14. In the embodiment of FIGS. 1-5, the second feed line 86 resides at the substrate 12 and laterally outside of the first microstrip segment 32. A longitudinal distance separates the second feed line 86 from the short circuit established at the ground plane 16 and at the shorting strip 17. The second feed line 86 resides at a location where it lacks overlap with the metalized pattern 14. Like the first feed line 84, the second feed line 86 can follow an overall unified course. Referring to FIG. 1, in this embodiment the second feed line 86 is shown with a first section set in the longitudinal direction $L_1$, and with a second section depending therefrom and set in the lateral direction $L_2$.

A terminal end 87 of the first section of the second feed line 86 resides at a position of overlap with the terminal end 96 and first feed connection point 97 of the first feed line 84. The terminal end 87 constitutes a second feed connection point 93 of the second feed line 86. The position of overlap between the first and second feed connection points 97, 93, respectively, is laterally outside of the first microstrip segment 32 and is distanced longitudinally from the first end 24 of the substrate 12 and from the short circuit established at the ground plane 16 and at the shorting strip 17. The position of overlap resides at a location where it lacks overlap with the metalized pattern 14. Further, an RF potential difference can be effected vertically across the substrate's body and across a distance of physical separation between the first and second feed lines 84, 86 at or adjacent the first and second feed connection points 97, 93, respectively. Furthermore, in this embodiment the second feed line 86 exhibits direct electrical connectivity with the first microstrip segment 32 and locally introduces RF signals thereto amid use of the RFID antenna 10. As presented in FIGS. 1 and 4, here, the second feed line 86 extends to the first side 39 of the first microstrip segment 32 at the substrate's top surface 20 where a connection is made therebetween. An RF side feed is thus established between the second feed line 86 and the first microstrip segment 32 at the first side 39.

Figure 8:
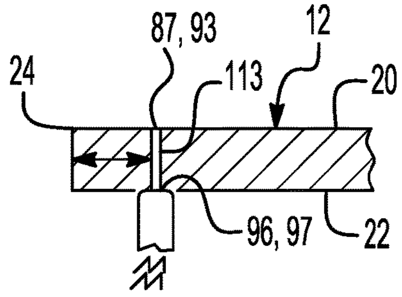
FIG. 8 is a depiction of an embodiment of a feed connection that can be implemented in the RFID antenna.

Referring now to FIG. 8, a feed connection 113 can be provided to deliver RF signals to the feed line(s) 18 and particularly to the first and second feed lines 84, 86. The feed connection 113 can communicate with an accompanying RFID reader and can introduce RF signals to the RFID antenna 10. The feed connection 113 can take different forms in different embodiments. With reference to FIG. 8, in one embodiment the feed connection 113 is in the form of a coaxial probe feed connection with a center conductor that is soldered in place to the second feed connection point 93 of the second feed line 86 and with an outer conductor that is soldered to the first feed connection point 97 of the first feed line 84; the location of the center and outer conductors can be exchanged with respect to the first and second feed connection points 93, 97 without altering the functionality of the RFID antenna 10. While depicted adjacent the substrate's bottom surface 22 in the schematic of FIG. 8, the coaxial probe feed connection can be installed adjacent the first side 28 of the substrate 12 in order to keep clear of the ground plane 16. The feed connection 113 electrically communicates with the first and second feed lines 84, 86 via a connection to the first and second feed connection points 97, 93. The connection is positioned laterally outside of the first microstrip segment 32 and is distanced longitudinally from the first end 24 of the substrate 12 and from the short circuit established at the ground plane 16 and at the shorting strip 17. Still, other types of feed connections that place a potential difference across the first and second feed connection points 97, 93 are possible in other embodiments. As but one example, a side launch coaxial connector could be employed with a center conductor soldered to the second feed connection point 93 and with an outer conductor soldered to the first feed connection point 97.

The RFID antenna 10 can function in different resonant modes of use and weighted combinations of those modes of use. In certain modes, and per certain embodiments, the RFID antenna 10 can exhibit a multi-linear polarization as a function of channel frequency that radiates a substantially linear first polarization and a substantially linear second polarization. The first and second linear polarizations have orientations that differ with respect to each other, and in this embodiment are arranged generally transverse and orthogonal relative to each other. Further, electromagnetic fields or waves are radiated in orientations that are arranged generally transverse and orthogonal with each other—for example, a horizontally-arranged electromagnetic field and a vertically-arranged electromagnetic field. The polarization diversity effected can be a function of a channel hop frequency of the accompanying RFID reader, according to an embodiment and described below in more detail. The different modes resonate at different frequencies are presented in more detail below by the graphs of FIGS. 14-18C. This diverse polarization can facilitate the ability to read RFID tags in various positions and orientations amid interrogation. RFID readers may hence effectively interrogate RFID tags irrespective of position and orientation of the tags. In the embodiment of the drawings, and referring particularly to FIGS. 6 and 7, the RFID antenna 10 works in at least two main modes of use: a first mode of use and a second mode of use. Each mode of use can resonate at a different portion of the associated operating bandwidth. The modes of use are excited by the common feed line(s) 18, as set forth, and the weighting between the two modes of use, or the proportional power delivered to each mode of use, as a function of the channel frequency.

The first mode of use is also a slot mode of the RFID antenna 10 and can be an odd mode in an embodiment. The first mode of use has a primary resonance at a first frequency and per an approximate one-half (½) of an operating wavelength or per an approximate one-quarter (¼) of an operating wavelength, according to varying embodiments. In the first mode, the first feed line 84 facilitates excitation of a resonant electromagnetic field in the slot formed by the first and second slots 60, 62 and the longitudinal third spacing 56 by introducing RF signals at a location where the magnitude of the resonant electric field is in a weaker state and may be near a null state at the first and second slots 60, 62. In the embodiment here, RF signals are introduced by the first feed line 84 at the longitudinal third spacing 56 and at a minimum E-field region 100. The minimum E-field region 100 is represented and approximated by the broken line in FIG. 6 and can have a greater size and extent than what is shown. The loop and second section 90 of the first feed line 84 overlap with the minimum E-field region 100. It has been observed that electrical impedance is decreased at the minimum E-field region 100 compared to other regions of the first and second slots 60, 62 and of the longitudinal third spacing 56 where the electrical impedance can be higher. The minimum E-field region 100 has been shown to facilitate RF signal introduction for the first mode of use in this regard. For instance, it has been found that locating the second section 90 of the first feed line 84 farther into the longitudinal third spacing 56 (e.g., in the longitudinal direction $L_1$ away from the shorting strip 17) can cause higher impedance, per certain embodiments. And conversely, it has been found that locating the second section 90 in the longitudinal direction $L_1$ toward the lateral microstrip 46 can cause lower impedance, per certain embodiments. In some embodiments, the second section 90 of the first feed line 84 can overlap with the lateral microstrip 46 and yet remain in close proximity to the longitudinal third spacing 56 and parallel to the longitudinal third spacing 56 with respect to the lateral direction $L_2$.

The first feed line 84, in conjunction with the second feed line 86, facilitates radiation of a first electromagnetic field across the first and second slots 60, 62 in the first mode of use. The longitudinal position of the second feed line 86 and alongside the first side 39 does not have a functionally significant influence on the establishment of the first electromagnetic field, at least according to this embodiment. Rather, per this embodiment, it is the design and construction of the first feed line 84 that has been found to be consequential to facilitating a suitable impedance match for the first mode or "slot mode" of use. Displacement of the second, lateral section of the second feed line 86 from the terminal end 87, in contrast, as denoted by an offset Δ in FIG. 4, has been observed to influence the impedance associated with the second mode of use according to this embodiment—e.g., increasing the offset Δ increases the impedance, while decreasing the offset Δ decreases the impedance. A first electric field component 102 associated with the first electromagnetic field is represented by the arrowed lines at the first and second slots 60, 62 in FIG. 6 (while the arrowed lines are illustrated as straight lines, the electric field 102 can be arcuate in nature). The first electromagnetic field and its first electric field 102, according to this embodiment, radiates at and across the first slot 60 from the third microstrip segment 36 and to the first microstrip segment 32 generally in the lateral direction $L_2$. Further, at the second slot 62, the first electromagnetic field and its first electric field 102 is radiated thereat and thereacross from the second microstrip segment 34 and to the third microstrip segment 36 generally in the lateral direction $L_2$. A maximum and dominant E-field region can be established in the first and second slots 60, 62, where a standing electromagnetic wave develops in the first mode of use. Further, the longitudinal third spacing 56 supports a portion of the standing electromagnetic wave at which the electric field is weaker in magnitude, and because vectors of the first electric field 102 are one-hundred-and-eighty degrees (180°) out of phase at the E-field region 100 relative to those at the first and second slots 60, 62, any radiation from the longitudinal third spacing 56 is negligible, per this embodiment. Moreover, in the first mode of use, an electromagnetic field may also extend and radiate beyond the first and second open ends 64, 66, respectively, of the first and second slots 60, 62.

The second mode of use is a so-called "patch mode" of the RFID antenna 10 and can be an even mode in an embodiment. The second mode of use has a primary resonance at a second frequency and per an approximate one-quarter (¼) of an operating wavelength. The second frequency differs from the first frequency of the first mode of use. The difference in magnitude between the first and second frequencies can be somewhat minor, per an embodiment. In the second mode of use, the second feed line 86, in conjunction with the first feed line 84, facilitates excitation of a second electromagnetic field at a volume beneath the metalized pattern 14 with a peak E-field near the first and second open ends 64, 66 and among the second ends 40, 44, 54 of the respective microstrip segments, as well as between the first and second open ends 64, 66 and the ground plane 16. The position of the first feed line 84 does not have a functionally significant influence on the establishment of the second electromagnetic field, at least according to this embodiment, and provided that the capacitor 98 has a location in proximity to the shorting strip 17. The second feed line 86 facilitates radiation of a second electric field 104 associated with the second electromagnetic field longitudinally at and across the first longitudinal spacing 48, at and across the second longitudinal spacing 50, and at and across the fourth longitudinal spacing 58. The second electric field 104 is represented by the arrowed lines at the first, second, and fourth longitudinal spacings 48, 50, 58 in FIG. 7 (while the arrowed lines are illustrated as straight lines, the second electric field 104 can be arcuate in nature and bend toward the ground plane 16). While not illustrated in FIG. 7, the second electromagnetic field depicted by the second electric field lines 104 can in one embodiment further fringe at and across the clearance 82 (see FIG. 3) from the second ends 40, 44, 54 of the respective microstrip segments downward to the ground plane 16 in the generally vertical direction and can be arcuate in nature. A maximum and dominant E-field region can be established at the first and second open ends 64, 66 and among the second ends 40, 44, 54 of the respective microstrip segments, where a maximum of a standing electromagnetic wave is formed. In contrast, the E-field is known to be in a weaker state, and even in a null state, at the shorting strip 17 from the ground plane 16 to the lateral microstrip 46. As demonstrated by FIGS. 6 and 7, the first electromagnetic field with the electric field 102 at the first and second slots 60, 62 is arranged generally transverse and orthogonal to the second electromagnetic field with the second electric field 104 at the longitudinal spacings 48, 50, 58.

The degree to which the first or slot modes and second or patch modes of use are excited can be a function of a channel hop frequency of the accompanying RFID reader, according to an embodiment. The slot and patch modes of use are not mutually exclusive. Rather, there can be a continuum of modes of uses, and hence a continuum of electromagnetic field polarization. In an example of this embodiment, there are a multitude of channel frequencies over an operational frequency bandwidth—a total of fifty (50) channel frequencies per a specific example. The particular channel frequency changes over time, and according to a frequency hopping spread spectrum protocol per an embodiment. The change has been shown to facilitate interoperability with other systems distinct from the RFID system employing the RFID antenna 10, and to facilitate mitigation of potential interference issues. For example, at a first end of the operational frequency bandwidth, the slot mode of use has an increased degree of strength and is chiefly dominant with respect to the patch mode of use. At an opposite, second end of the operational frequency bandwidth, the patch mode of use has an increased degree of strength and is chiefly dominant with respect to the slot mode of use. At intermediate channel frequencies of the operational frequency bandwidth residing between the first and second ends, the slot and patch modes of use are present to varying degrees. The slot mode of use exhibits an excitation of progressively increasing magnitude at channel frequencies in closer proximity to the first end of the operational frequency bandwidth. The patch mode of use, on the other hand, exhibits an excitation of progressively increasing magnitude at channel frequencies in closer proximity to the second end of the operational frequency bandwidth. A gradual shift in weighting that favors the slot mode of use occurs closer to the first end of the operational frequency bandwidth, and a gradual shift in weighting that favors the patch mode of use occurs closer to the second end of the operational frequency bandwidth. Moreover, an electromagnetic field polarization tilt angle also varies with the changing channel frequencies of the operational frequency bandwidth and based on the varying magnitudes of the slot and patch modes of use. U.S. Pat. No. 10,567,146, issued on Feb. 18, 2020, and having a common applicant and assignee with the present patent application, describes a channel frequency that changes over time. The entire contents of the '146 patent are hereby incorporated by reference.

FIGS. 14-18C present graphs that demonstrate the effective performance of the RFID antenna 10 and its diverse polarization in the first and second modes of use. The results presented are the outcome of full wave simulations that were conducted with an RFID antenna similar to the RFID antenna 10 of FIGS. 1-7; still, other simulations may yield other results. With reference to the graph of FIG. 14, frequency in megahertz (MHz) is plotted on an x-axis and impedance in Ohms (Ω) is plotted on a y-axis. A real line $L_1$ and an imaginary line $L_2$ represent simulated results. The first mode of use is indicated at approximately $M_1$, and the second mode of use is indicated at approximately $M_2$, although operation may not extend entirely to $M_1$ or entirely to $M_2$. In an example, a low end of the operational band may reside at 902 MHz, which is considered close enough to the mode resonance $M_1$ in order to achieve the desired performance associated with that mode. Certain circumstances may have the imaginary line $L_2$ operating at an impedance near and around 0. This imaginary impedance represents stored energy. Further, certain other circumstances may have the real line $L_1$ at an impedance near and around the associated feed line characteristic impedance, which in this example is approximately 50 Ohms but may vary in other examples. This real impedance represents radiated energy.

Figure 15A:
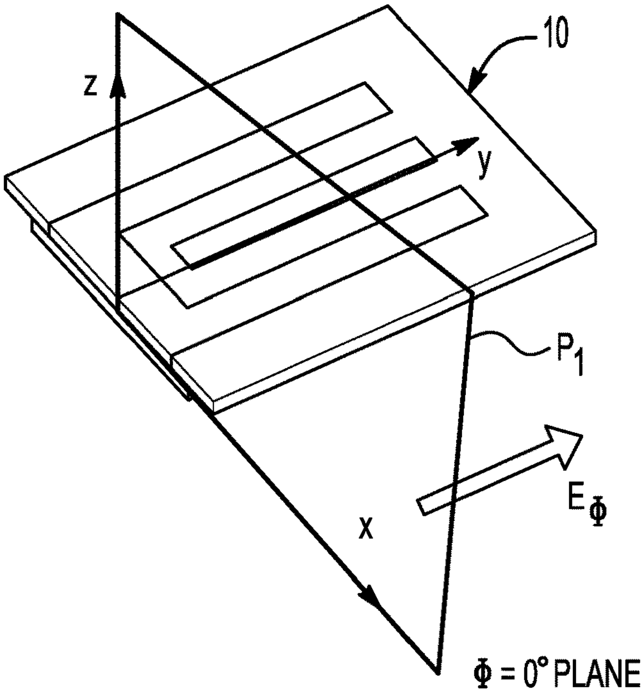
FIG. 15A is a depiction of an x-z plane for $\phi=0°$ of the RFID antenna of FIG. 1.
Figure 15B:
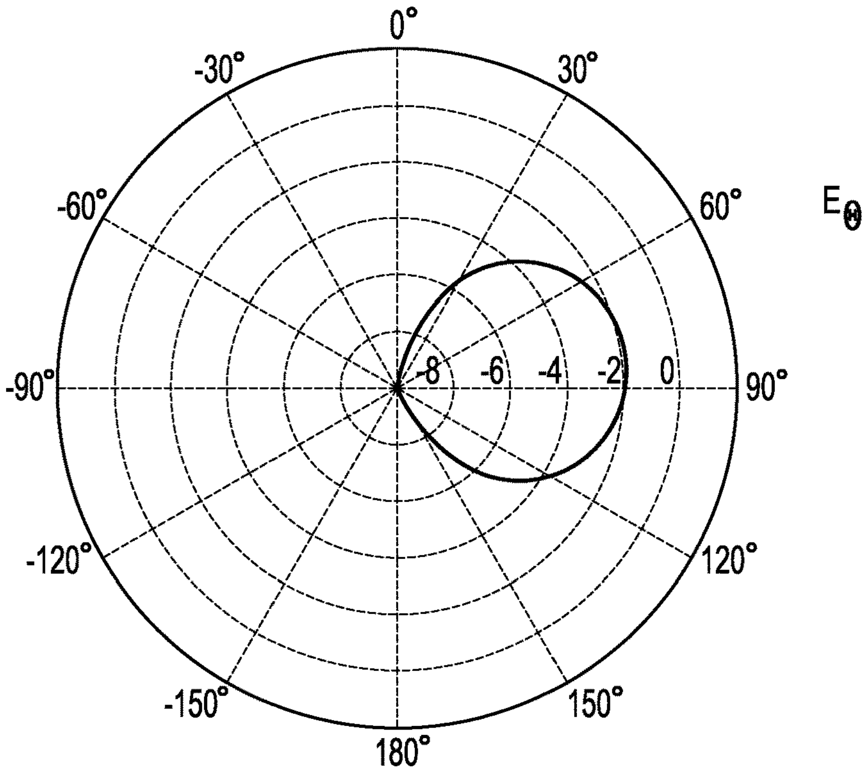
FIG. 15B is a graph of a simulated radiation pattern per the plane of FIG. 15A of $E_\theta$ for $\phi=0°$ at a frequency of 898 megahertz (MHz)
Figure 15C:
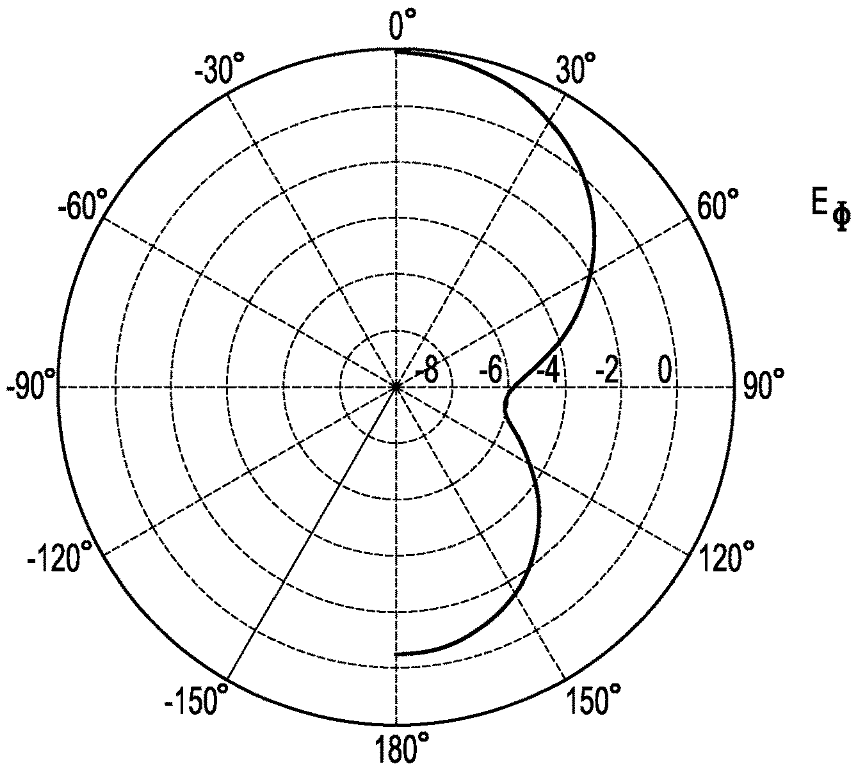
FIG. 15C is a graph of a simulated radiation pattern per the plane of FIG. 15A of $E_\phi$ for $\phi=0°$ at a frequency of 898 MHz.
Figure 16A:
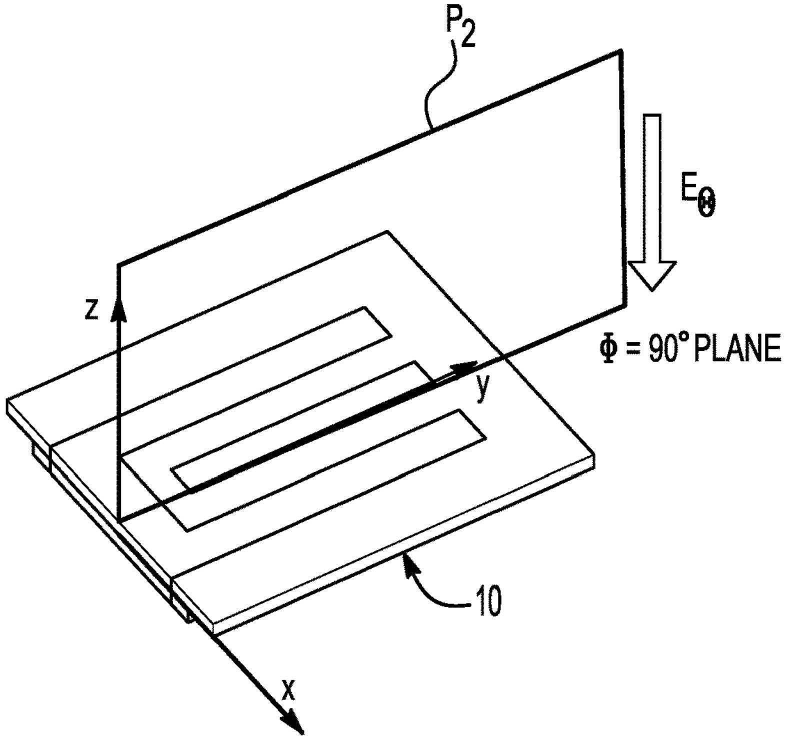
FIG. 16A is a depiction of a y-z plane for $\phi=90°$ of the RFID antenna of FIG. 1.
Figure 16B:
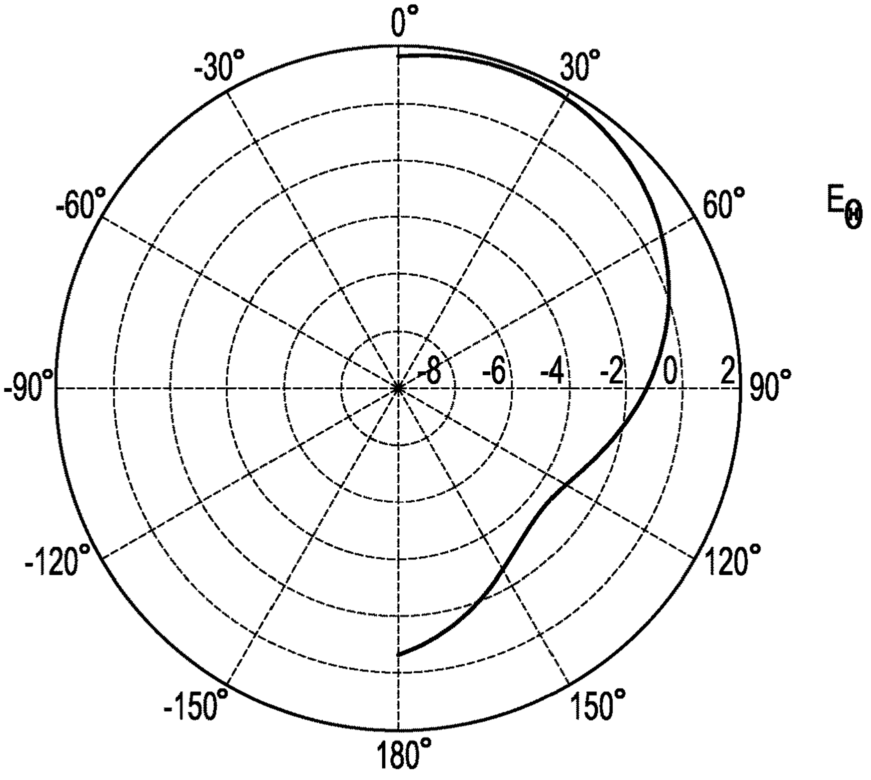
FIG. 16B is a graph of a simulated radiation pattern per the plane of FIG. 16A of $E_\theta$ for $\phi=90°$ at a frequency of 898 MHz.
Figure 16C:
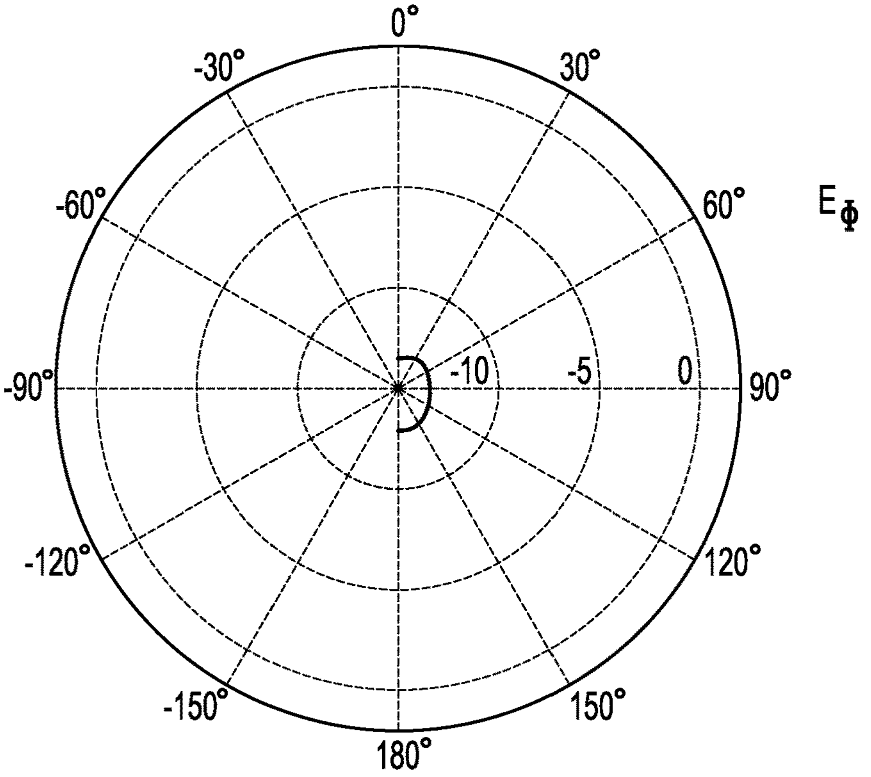
FIG. 16C is a graph of a simulated radiation pattern per the plane of FIG. 16A of $E_\phi$ for $\phi=90°$ at a frequency of 898 MHz.
Figure 17A:
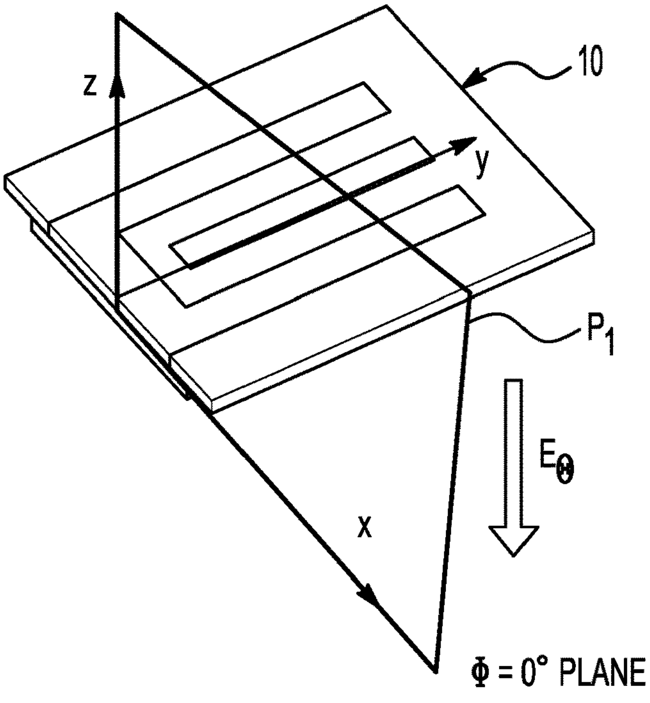
FIG. 17A is a depiction of an x-z plane for $\phi=0°$ of the RFID antenna of FIG. 1.
Figure 17B:
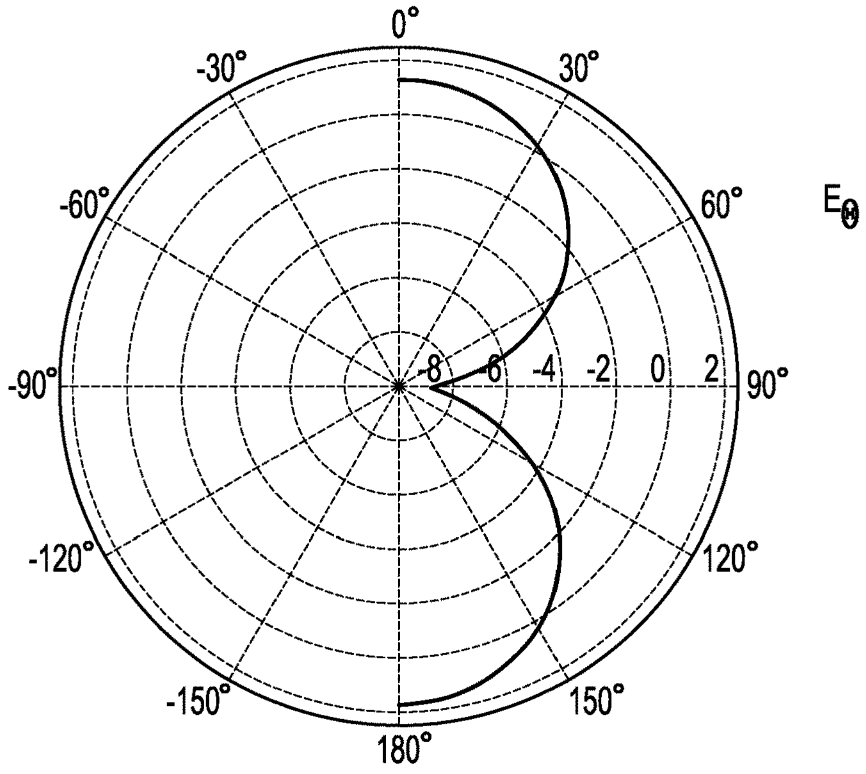
FIG. 17B is a graph of a simulated radiation pattern per the plane of FIG. 17A of $E_\theta$ for $\phi=0°$ at a frequency of 924 MHz.
Figure 17C:
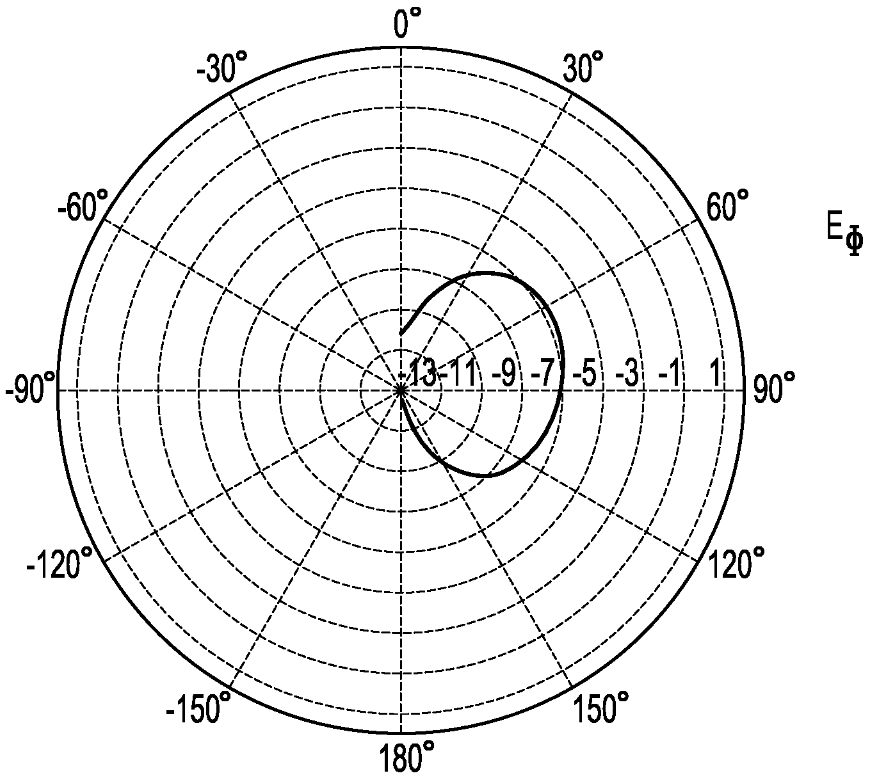
FIG. 17C is a graph of a simulated radiation pattern per the plane of FIG. 17A of $E_\phi$ for $\phi=0°$ at a frequency of 924 MHz.

FIGS. 15A-18C demonstrate the first and second modes of use of the RFID antenna 10, including the radiation and the resultant diverse polarization as a function of frequency. FIGS. 15A-16C demonstrate radiation at the second mode of use and at a relatively lower end of the operating bandwidth according to this embodiment. FIG. 15A informs the radiation patterns of FIGS. 15B and 15C. An x-z plane $P_1$ for $\phi=0°$ is presented with respect to the RFID antenna 10 in FIG. 15A and shows a directional arrow $E_\phi$. In FIG. 15B, a graph of the radiation pattern of $E_\theta$ for $\phi=0°$ at a frequency of 898 MHz is shown. The maximum gain observed for this polarization in this plane and for this simulation was −1.8441 dBi; still, other simulations may yield other radiation patterns and other maximum gains. In FIG. 15C, a graph of the radiation pattern of $E_\phi$ for $\phi=0°$ at a frequency of 898 MHz is shown. The maximum gain observed for this polarization in this plane and for this simulation was 1.8795 dBi; still, other simulations may yield other radiation patterns and other maximum gains. Further, a y-z plane $P_2$ for $\phi=90°$ is presented with respect to the RFID antenna 10 in FIG. 16A and shows a directional arrow $E_\theta$. In FIG. 16B, a graph of the radiation pattern of $E_\theta$ for $\phi=90°$ at a frequency of 898 MHz is shown. The maximum gain observed for this polarization in this plane and for this simulation was 2.1144 dBi; still, other simulations may yield other radiation patterns and other maximum gains. In FIG. 16C, a graph of the radiation pattern of $E_\phi$ for $\phi=90°$ at a frequency of 898 MHz is shown. The maximum gain observed for this polarization in this plane and for this simulation was −12.9081 dBi; still, other simulations may yield other radiation patterns and other maximum gains.

Figure 18A:
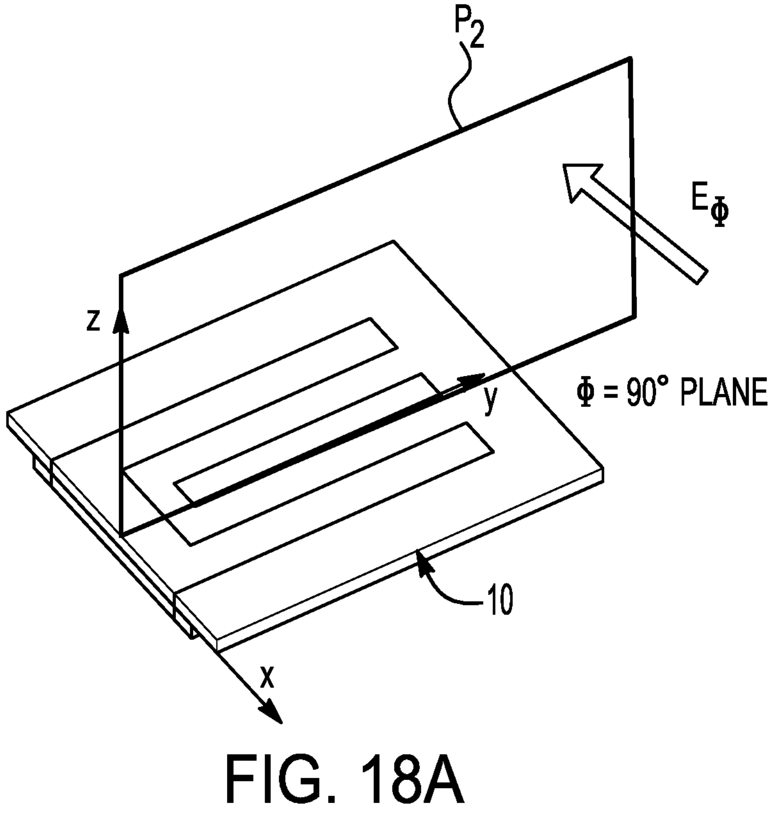
FIG. 18A is a depiction of a y-z plane for $\phi=90°$ of the RFID antenna of FIG. 1.
Figure 18B:
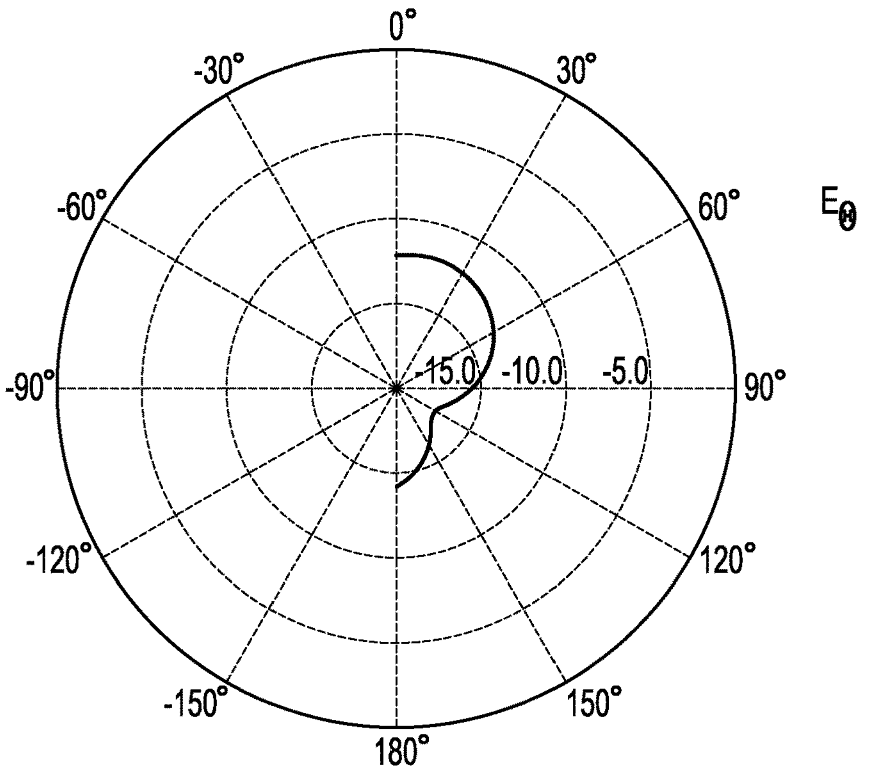
FIG. 18B is a graph of a simulated radiation pattern per the plane of FIG. 18A of $E_\theta$ for $\phi=90°$ at a frequency of 924 MHz.
Figure 18C:
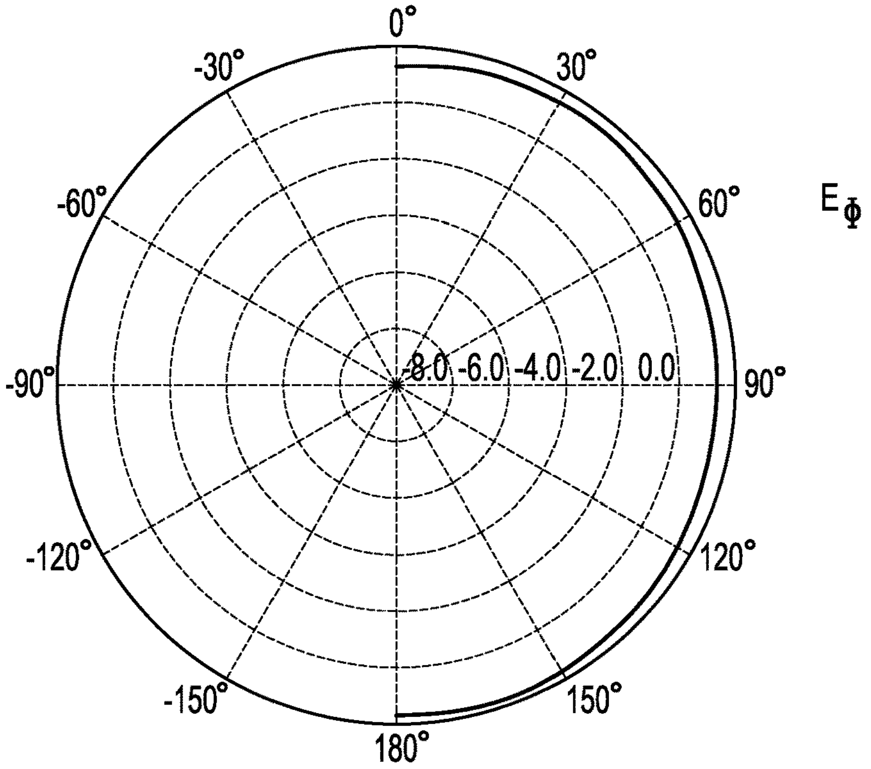
FIG. 18C is a graph of a simulated radiation pattern per the plane of FIG. 18A of $E_\phi$ for $\phi=90°$ at a frequency of 924 MHz.

FIGS. 17A-18C demonstrate radiation at the first mode of use and at a relatively higher end of the operating bandwidth according to this embodiment. The x-z plane $P_1$ for $\phi=0°$ is presented with respect to the RFID antenna 10 in FIG. 17A and shows a directional arrow Ee. In FIG. 17B, a graph of the radiation pattern of $E_\theta$ for $\phi=0°$ at a frequency of 924 MHz is shown. The maximum gain observed for this polarization in this plane and for this simulation was 1.7033 dBi; still, other simulations may yield other radiation patterns and other maximum gains. In FIG. 17C, a graph of the radiation pattern of $E_\phi$ for $\phi=0°$ at a frequency of 924 MHz is shown. The maximum gain observed for this polarization in this plane and for this simulation was −6.7015 dBi; still, other simulations may yield other radiation patterns and other maximum gains. Further, the y-z plane $P_2$ for $\phi=90°$ is presented with respect to the RFID antenna 10 in FIG. 18A and shows a directional arrow $E_\phi$. In FIG. 18B, a graph of the radiation pattern of $E_\theta$ for $\phi=90°$ at a frequency of 924 MHz is shown. The maximum gain observed for this polarization in this plane and for this simulation was −12.0141 dBi; still, other simulations may yield other radiation patterns and other maximum gains. In FIG. 18C, a graph of the radiation pattern of $E_\phi$ for $\phi=90°$ at a frequency of 924 MHz is shown. The maximum gain observed for this polarization in this plane and for this simulation was 1.7790 dBi; still, other simulations may yield other radiation patterns and other maximum gains.

Overall, the RFID antenna 10 can exhibit a form factor that is minimized and smaller in physical size and shape compared to past RFID antennas that also provide diversified polarization. In one prototyped example, for instance, the substrate 12 can have a lengthwise and longitudinal dimension measured between the first end 24 and the second end 26 of approximately 0.08286 meters (m); still, other dimensions are possible in other examples. The substrate 12 can have a vertical thickness dimension measured between the top surface 20 and the bottom surface 22 of approximately 0.00152 m; still, other dimensions are possible in other examples. Further, the first and second microstrip segments 32, 34 can have a lengthwise and longitudinal dimension measured between the substrate's first end 24 and the second ends 40, 44 of approximately 0.06883 m; still, other dimensions are possible in other examples. The metalized pattern 14 can have a lateral dimension measured between the first side 39 and the first side 43 of approximately 0.05007 m; still, other dimensions are possible in other examples. The lateral microstrip 46 can have a widthwise dimension measured in the longitudinal direction $L_1$ of approximately 0.01024 m; still, other dimensions are possible in other examples. The first slot 60 can have a lateral dimension measured between the second side 41 and the third microstrip segment 36 of approximately 0.00863 m, and likewise the second slot 62 can have a lateral dimension measured between the second side 45 and the third microstrip segment 36 of approximately 0.00863; still, other dimensions are possible in other examples. Yet further, the first, second, and fourth longitudinal spacings 48, 50, 58 can have lengthwise dimensions measured between the second ends 40, 44, 54 and the free end 26 of approximately 0.01403 m; still, other dimensions are possible in other examples. The longitudinal third spacing 56 can have a lengthwise dimension measured between the lateral microstrip 46 and the first end 52 of approximately 0.00575 m; still, other dimensions are possible in other examples. Lastly, the ground plane 16 can have a lateral dimension measured between the first side 78 and the second side 80 of approximately 0.06593 m, and the clearance 82 can have a vertical dimension measured between the top surface 72 and the bottom surface 22 of approximately 0.00483 m; still, other dimensions are possible in other examples.

Furthermore, a second embodiment of the RFID antenna is presented in FIGS. 9-13. In the second embodiment, corresponding components and elements are numbered similarly but with the numerals 2xx as an indication of this second embodiment. For example, the RFID antenna is indicated by numeral 10 in the first embodiment and is correspondingly indicated by numeral 210 in the second embodiment. Moreover, similarities may exist between the first embodiment and the second embodiment, some of which may not be repeated here in the description of the second embodiment.

Figure 9:
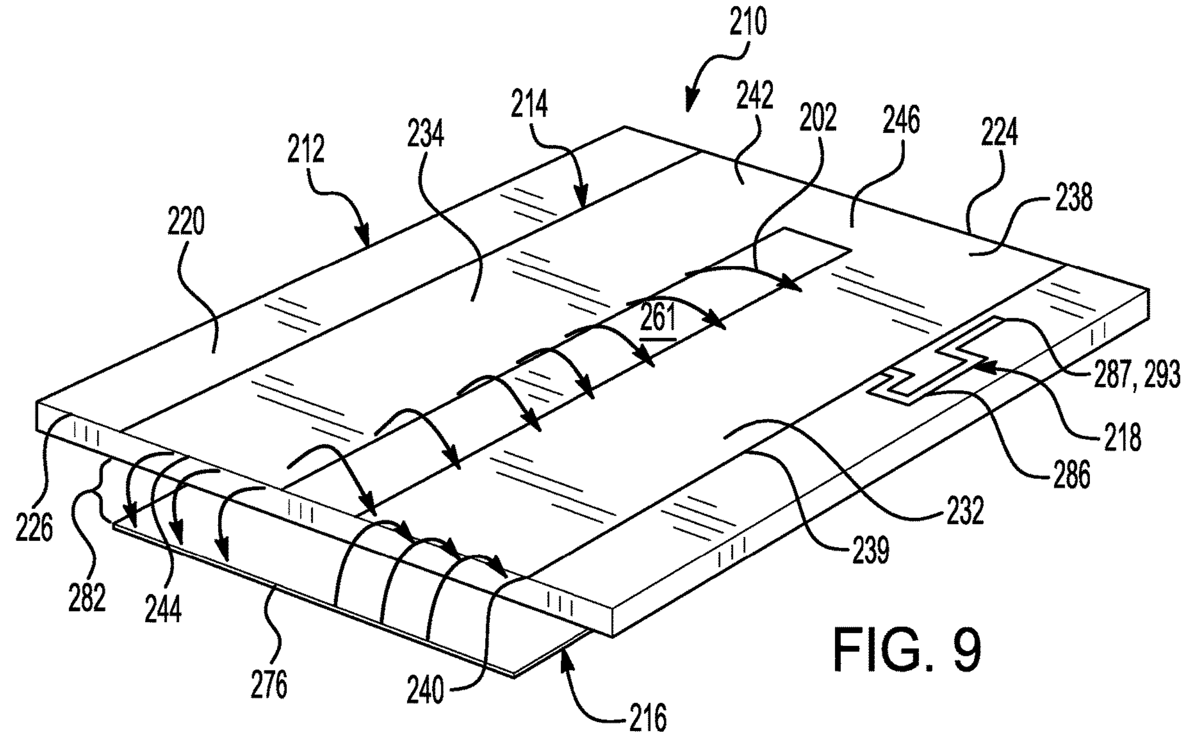
FIG. 9 is a perspective view of another embodiment of a radio-frequency identification (RFID) antenna, depicting a first electromagnetic field in a first mode of use of the RFID antenna.
Figure 10:
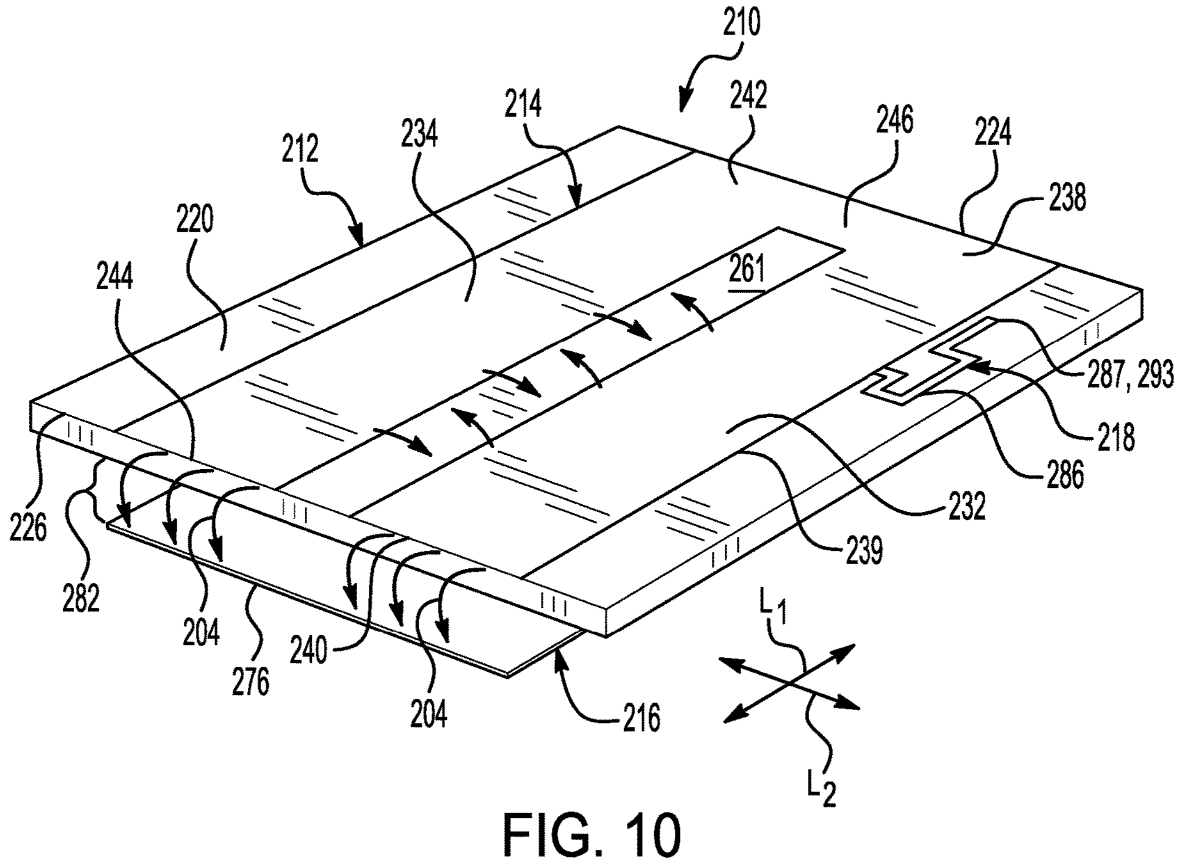
FIG. 10 is a perspective view of the RFID antenna of FIG. 9, depicting a second electromagnetic field in a second mode of use of the RFID antenna.
Figure 11:
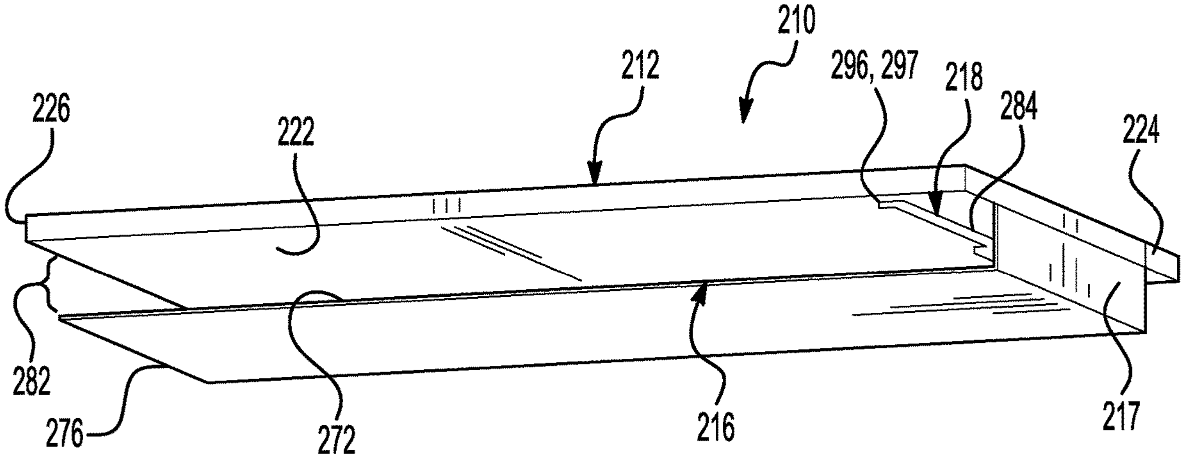
FIG. 11 is another perspective view of the RFID antenna of FIG. 9.

With reference to FIGS. 9-11, the second embodiment of the RFID antenna 210 includes a substrate 212, a metalized pattern 214, a ground plane 216, a shorting strip 217, and one or more feed lines 218. Still, the RFID antenna 210 could have more, less, and/or different components in other embodiments. In general, the substrate 212 has a top surface 220 and a bottom surface 222 and has a longitudinal extent spanning between a first end 224 and a second end 226. The second end 226 establishes a distal and free end of the substrate 212. Unlike the first embodiment, the metalized pattern 214 in the second embodiment has only a pair of microstrip segments set in the longitudinal direction $L_1$—a first microstrip segment 232 and a second microstrip segment 234. The first and second microstrip segments 232, 234 are carried by the substrate 212 and reside on the substrate's top surface 220. The first and second microstrip segments 232, 234 can have a length in the longitudinal direction $L_1$ that is approximately one-quarter (¼) of an operating wavelength in dimension; still, the first and second microstrip segments could have other length dimensions in other embodiments. Further, the first and second microstrip segments 232, 234 are adjoined and coupled together at first ends 238, 242, establishing a lateral microstrip 246. Opposite the first ends 238, 242, the first and second microstrip segments 232, 234 are not adjoined at second ends 240, 244, and thereby lack coupling thereat. The first and second microstrip segments 232, 234 may span lengthwise and longitudinally all-the-way to the substrate's free end 226. The second ends 240, 244 may terminate at the substrate's free end 226 and are hence located at the free end 226 as depicted in the drawings.

Also, unlike the first embodiment, the geometric pattern of the metalized pattern 214 in the second embodiment provides only a single slot that radiates electromagnetic waves amid use of the RFID antenna 210. A slot 261 resides at the top surface 220 and is established, in part, via the lateral spacing provided between the first microstrip segment 232 and the second microstrip segment 234. The slot 261 spans lengthwise and longitudinally from the lateral microstrip 246 and to the substrate's free end 226. Further, a clearance 282 is also essentially an air gap established between the ground plane 216 and the substrate 212. In the second embodiment, the clearance 282 is established locally between the second ends 240, 244 of the first and second microstrip segments 232, 234 and the ground plane's terminal end 276, and between the substrate's free end 226 and the ground plane's terminal end 276. Electromagnetic waves can radiate therebetween amid use of the RFID antenna 210.

With particular reference now to FIGS. 10-13, the feed line(s) 218 includes a first feed line 284 and a second feed line 286. The first feed line 284 resides on the substrate's bottom surface 222, and the second feed line 286 resides on the substrate's top surface 220. As before, the first and second feed lines 284, 286 can have varied paths dictated in part by the geometric pattern of the metalized pattern 214. In the second embodiment, a main section 289 of the first feed line 284 is set in the lateral direction $L_2$ and overlaps with the coupling at the first ends 238, 242 of the first and second microstrip segments 232, 234. The lateral microstrip 246 is overlapped by the first feed line 284 and its main section 289. Further, a second and terminal section 291 of the first feed line 284 depends from the main section 289 and is set in the longitudinal direction $L_1$. The main section 289 spans beyond the lateral microstrip 246, locating the second section 291 laterally outside of a first side 239 of the first microstrip segment 232. The second section 291 lacks overlap with the metalized pattern 214. A terminal end 296 of the second section 291 can reside at or adjacent a position of overlap with the second feed line 286 and at the substrate 212 where the terminal end 296 lacks overlap with the metalized pattern 214. The terminal end 296 constitutes a first feed connection point 297 of the first feed line 284 that receives connection to, and communication with, a feed connection for exchanging RF signals therebetween. Opposite the terminal end 296, the first feed line 284 can terminate at a capacitor 298. In the second embodiment, the capacitor 298 can partially or fully overlap with the lateral microstrip 246 and can partially or fully overlap with the second microstrip segment 234 adjacent the first end 242. The capacitor 298 can have a lateral location that is closer in proximity to the second microstrip segment 234 than the first microstrip segment 232, as shown. The capacitor 298 can take different forms in different embodiments, including in the form of a metallic plate, as previously described.

Figure 12:
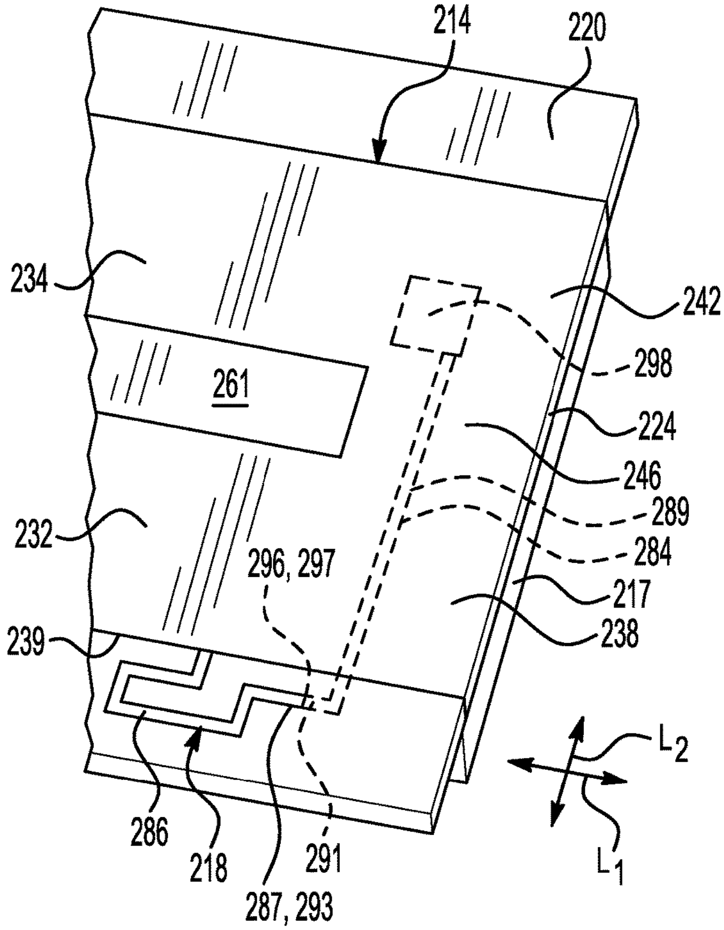
FIG. 12 is an enlarged view of the RFID antenna of FIG. 9, depicting an embodiment of a feed line.
Figure 13:
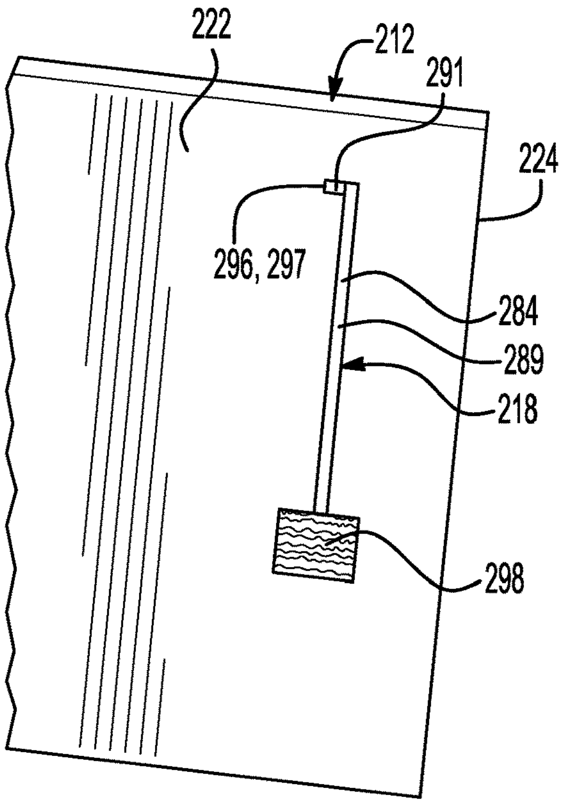
FIG. 13 is an enlarged view of the RFID antenna of FIG. 9, depicting an embodiment of a feed line.
Figure 14:
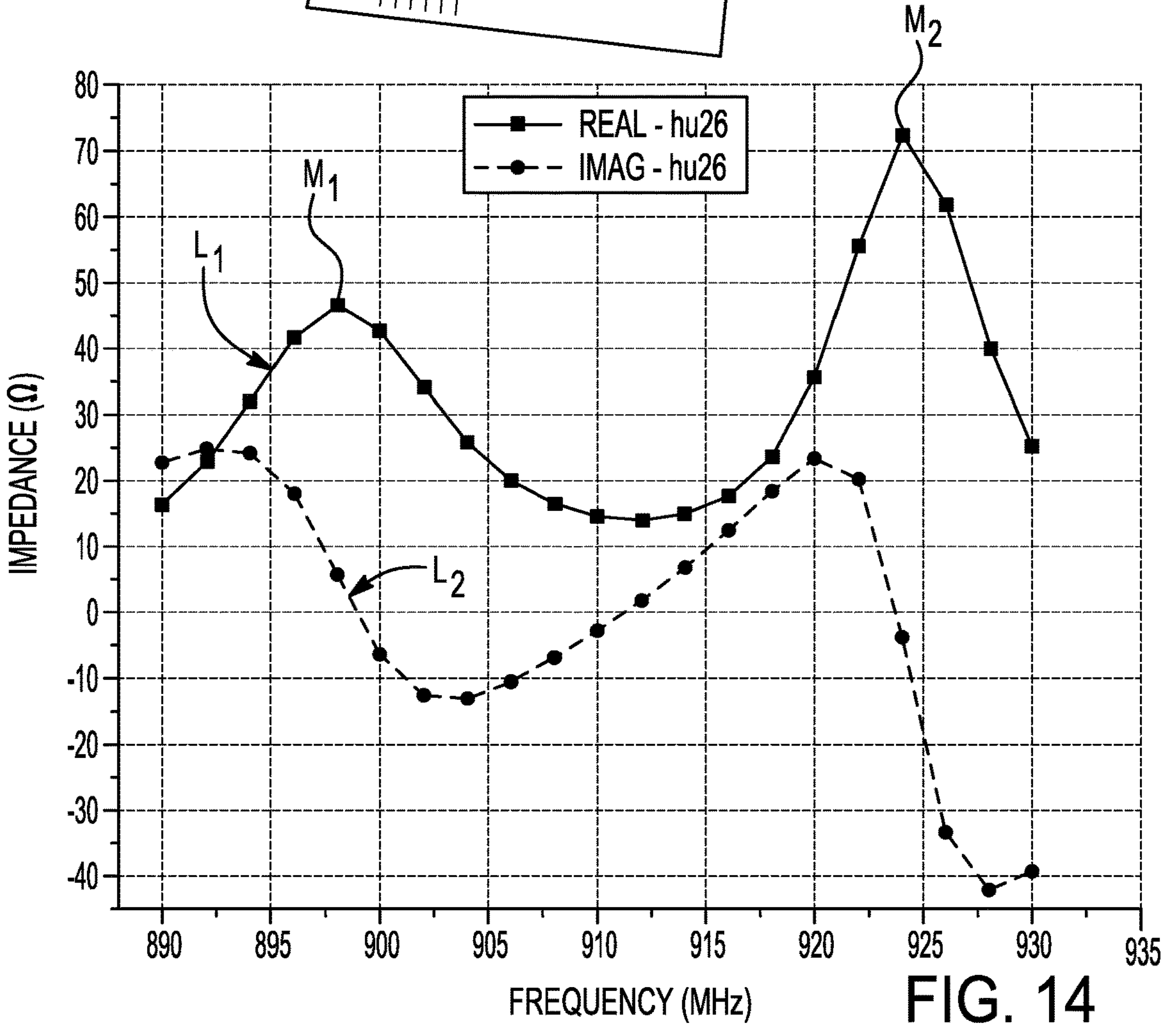
FIG. 14 is a graph of simulation results of the RFID antenna of FIG. 1, depicting frequency (megahertz (MHz)) on an x-axis and impedance on a y-axis (Ohms ((2))

Referring particularly to FIGS. 10 and 12, in the second embodiment the second feed line 286 exhibits an overall path with several sections and several turns in the longitudinal and lateral directions $L_1$, $L_2$. The second feed line 286 can establish an inductive feed loop at the substrate's top surface 220 and laterally outside of the first microstrip segment 232. As before, a terminal end 287 and second feed connection point 293 of the second feed line 286 reside at a position of overlap with the terminal end 296 and first feed connection point 297 of the first feed line 284. The second feed line 286 has direct electrical connectivity with the first microstrip segment 232, and locally introduces RF signals thereto amid use of the RFID antenna 210. As presented in FIG. 10, the second feed line 286 extends to the first side 239 of the first microstrip segment 232 where an RF side feed is established therebetween in the second embodiment.

The RFID antenna 210 can function in different modes of use and can exhibit a multi-linear polarization as a function of a channel hop frequency (described above previously) with electromagnetic fields arranged generally transverse and orthogonal, as previously described. In the first mode of use, the first feed line 284, in conjunction with the second feed line 286, facilitates radiation of a first electromagnetic field with a first electric field 202 at the slot 261 as shown in FIG. 9. Moreover, in the first mode, an electromagnetic field may also exist at the second ends 240, 244 and at and across the clearance 282. But significant portions of this electromagnetic field are opposite and out-of-phase—as demonstrated by the contrary arrowed lines at the clearance 282 in FIG. 9—and therefore radiation from that portion of the electromagnetic field is largely inconsequential relative to that of the first electromagnetic field with the first electric field 202. Furthermore, in the first mode of use, the effective electrical length and distance for effecting electrical resonance is established in the longitudinal direction $L_1$ approximately between a short circuit formed at the adjoinment of the first and second microstrip segments 232, 234 and the second ends 240, 244.

In the second mode of use, the second feed line 286, in conjunction with the first feed line 284, facilitates radiation of a second electromagnetic field with a second electric field 204 at the second ends 240, 244 and at and across the clearance 282 as shown in FIG. 10. Moreover, in the second mode, an electromagnetic field may also exist at the slot 261. But significant portions of this electromagnetic field are opposite and out of phase—as demonstrated by the contrary arrowed lines at the slot 261 in FIG. 10—and therefore radiation at the electromagnetic field is largely inconsequential relative to that of the second electromagnetic field; in other words, for the second electromagnetic field, the second electric field 204 at the slot 261 is very low or effectively null. As demonstrated by FIGS. 9 and 10, the first electromagnetic field with the first electric field 202 at the slot 261 is arranged generally transverse and orthogonal to the second electromagnetic field with the second electric field 204 at the clearance 282. Furthermore, in the second mode of use, the effective electrical length and distance for effecting electrical resonance is established in the longitudinal direction $L_1$ approximately between the first end 224 (e.g., where the first and second microstrip segments 232, 234 are short-circuited to the ground plane 216) and the second ends 240, 244. In an embodiment, because the effective electrical length of the second mode of use is greater than that of the first mode of use, the resonant frequency would be lower in the second mode of use. In general, however, according to some embodiments, the effective electrical lengths of the first and second modes of use can be influenced by the permittivity of the substrate 212 and the lateral width of the slot 261. In this regard then, the effective electrical length of the first mode of use can be made greater than that of the second mode of use, as may be desired, by modifying the substrate's permittivity and/or modifying the slot's lateral width.

Figure 20:
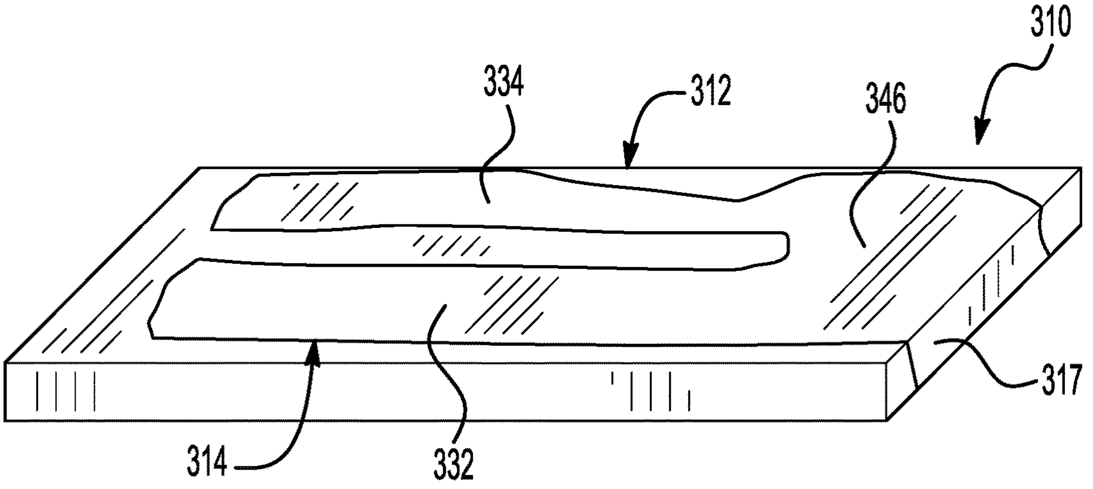
FIG. 20 is a perspective view of yet another embodiment of a radio-frequency identification (RFID) antenna.

A third embodiment of the RFID antenna is presented in FIG. 20. In the third embodiment, corresponding components and elements are numbered similarly but with the numerals 3xx as an indication of this third embodiment. For example, the RFID antenna is indicated by numeral 10 in the first embodiment and is correspondingly indicated by numeral 310 in the third embodiment. Moreover, similarities may exist between the first embodiment and the third embodiment, some of which may not be repeated here in the description of the third embodiment.

With reference to the components depicted in FIG. 20, the third embodiment of the RFID antenna 310 includes a substrate 312, a metalized pattern 314, and a shorting strip 317. Although lacking depiction, the RFID antenna 310 further includes the ground plane and feed line(s) of previous embodiments. Still, the RFID antenna 310 could have more, less, and/or different components in other embodiments. Unlike the first and second embodiments, the metalized pattern 314 can exhibit an overall non-rectilinear conformation. A first microstrip segment 332 is non-linear and non-uniform in its longitudinal and lateral extents, and likewise a second microstrip segment 334 is non-linear and non-uniform in its longitudinal and lateral extents. In a similar way, a lateral microstrip 346 is non-linear and non-uniform, as well as the shorting strip 317. In other embodiments, the overall non-rectilinear conformation can be implemented for the metalized patterns 14, 214 of the first and second embodiments. Furthermore, in other embodiments, the metalized pattern 14 of the first embodiment with the first and second slots 60, 62 could have its microstrip segments 32, 34, 36 and lateral microstrip 46 with more curvilinear constructs similar to that of the third embodiment, while maintaining the first and second electromagnetic fields of the first and second modes of use, respectively.

Still, other embodiments of the RFID antenna could combine designs, constructions, and components of the first, second, and third embodiments together. For instance, an embodiment of the RFID antenna could have the metalized pattern of the first embodiment and could have one or more of the feed lines of the second embodiment. Furthermore, in other embodiments, the clearances 82, 282 could be filled-in with dielectric material and hence be different from the air-gap configuration shown in the drawings.

As used herein, the term "generally" is intended to account for the inherent degree of variance and imprecision that is often attributed to, and often accompanies, any design and manufacturing process, including engineering tolerances—and without deviation from the intended functionality and outcome—such that mathematical precision is not implied and, in some instances, is not possible.

It is to be understood that the foregoing is a description of one or more aspects of the disclosure. The disclosure is not limited to the particular embodiment(s) disclosed herein, but rather is defined solely by the claims below. Furthermore, the statements contained in the foregoing description relate to particular embodiments and are not to be construed as limitations on the scope of the disclosure or on the definition of terms used in the claims, except where a term or phrase is expressly defined above. Various other embodiments and various changes and modifications to the disclosed embodiment(s) will become apparent to those skilled in the art now having the benefit of this description. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items.

Other terms are to be construed using their broadest reasonable meaning unless they are used in a context that requires a different interpretation.

What is claimed is:

1. A radio-frequency identification (RFID) antenna, comprising:

a substrate, wherein the substrate comprises a top surface and a bottom surface;

a first microstrip segment residing on the substrate;

a second microstrip segment residing on the substrate, the first microstrip segment and the second microstrip segment being adjoined with each other by a lateral microstrip adjacent at first ends of the first and second microstrip segments, the first microstrip segment and the second microstrip segment lacking adjoinment with each other at second ends of the first and second microstrip segments;

at least one slot situated between the first microstrip segment and the second microstrip segment, the at least one slot spanning from the adjoined first ends of the first and second microstrip segments to the second ends of the first and second microstrip segments;

a ground plane;

a shorting strip extending between the lateral microstrip and the ground plane; and at least one feed line, wherein the at least one feed line comprises a first feed line residing at the bottom surface of the substrate and a second feed line residing at the top surface of the substrate, wherein a feed connection is electrically adjoined to the first feed line and to the second feed line, the feed connection introducing RF signals to the RFID antenna via the first and second feed lines.

2. The radio-frequency identification (RFID) antenna of claim 1, wherein a first lengthwise extent of the first microstrip segment terminates at the second end of the first microstrip segment, a first longitudinal spacing being situated between the second end of the first microstrip segment and a free end of the substrate, and wherein a second lengthwise extent of the second microstrip segment terminates at the second end of the second microstrip segment, a second longitudinal spacing being situated between the second end of the second microstrip segment and the free end of the substrate.

3. The radio-frequency identification (RFID) antenna of claim 1, wherein the first microstrip segment spans lengthwise to a free end of the substrate, the second microstrip segment spans lengthwise to the free end of the substrate, and the second ends of the first and second microstrip segments being located at the free end of the substrate.

4. The radio-frequency identification (RFID) antenna of claim 1, further comprising a third microstrip segment residing on the substrate, the third microstrip segment being located between the first and second microstrip segments, the third microstrip segment lacking attachment with the first microstrip segment, with the second microstrip segment, and with the lateral microstrip.

5. The radio-frequency identification (RFID) antenna of claim 4, wherein the at least one slot comprises a first slot situated between the first microstrip segment and the third microstrip segment and a second slot situated between the second microstrip segment and the third microstrip segment.

6. The radio-frequency identification (RFID) antenna of claim 1, wherein the ground plane has a terminal end opposite the shorting strip, the terminal end opposing the first microstrip segment and the second microstrip segment across a clearance established between the ground plane and the first and second microstrip segments.

7. The radio-frequency identification (RFID) antenna of claim 6, wherein, in a first mode of use, a first electromagnetic field radiates at the at least one slot, and wherein, in a second mode of use, a second electromagnetic field radiates adjacent the clearance.

8. The radio-frequency identification (RFID) antenna of claim 7, wherein the first electromagnetic field exhibits increasing excitation at RFID channel frequencies toward a first end of an operational frequency bandwidth, and wherein the second electromagnetic field exhibits increasing excitation at RFID channel frequencies toward a second end of the operational frequency bandwidth.

9. The radio-frequency identification (RFID) antenna of claim 1, wherein at least one section of the first feed line overlaps with the adjoined first ends of the first and second microstrip segments, and wherein the second feed line is electrically connected to the first microstrip segment.

10. The radio-frequency identification (RFID) antenna of claim 1, wherein at least one section of the first feed line overlaps with the at least one slot at a location adjacent the adjoined first ends of the first and second microstrip segments, or the at least one section of the first feed line is located adjacent the adjoined first ends of the first and second microstrip segments.

11. The radio-frequency identification (RFID) antenna of claim 1, further comprising a capacitor with a metallic plate residing at the bottom surface of the substrate and overlapping with the adjoined first ends of the first and second microstrip segments, the first feed line terminating at the metallic plate of the capacitor.

12. A radio-frequency identification (RFID) antenna, comprising:

a substrate;

a metalized pattern carried by the substrate on a top surface of the substrate, the metalized pattern having at least a first microstrip segment, a second microstrip segment, and a lateral microstrip, the first microstrip segment spanning lengthwise between a first end and a second end, the second microstrip segment spanning lengthwise between a first end and a second end, the lateral microstrip adjoining the first microstrip segment and the second microstrip segment together at the first ends thereof, the metalized pattern having at least one slot situated between the first and second microstrip segments, the at least one slot having a lengthwise extent that spans between the first ends and the second ends of the first and second microstrip segments;

a ground plane extending from the substrate via a shorting strip, the shorting strip electrically connecting the metalized pattern to the ground plane; and, a clearance, established between the ground plane and the substrate at the second ends of the first and second microstrip segments, the clearance having a lateral extent arranged generally transverse to the lengthwise extent of the at least one slot;

wherein, in a first mode of use, a first electromagnetic field radiates from the at least one slot, and, in a second mode of use, a second electromagnetic field radiates adjacent the clearance.

13. The radio-frequency identification (RFID) antenna of claim 12, wherein the metalized pattern further comprises a third microstrip segment, wherein the at least one slot includes a first slot and a second slot, the third microstrip segment being located between the first microstrip segment and the second microstrip segment, the first slot being situated between the first microstrip segment and the third microstrip segment, the second slot being situated between the second microstrip segment and the third microstrip segment, and wherein a longitudinal spacing is situated between the lateral microstrip and the third microstrip segment.

14. The radio-frequency identification (RFID) antenna of claim 13, further comprising a feed line residing at a bottom surface of the substrate, wherein at least one section of the feed line overlaps with the longitudinal spacing, the feed line terminating at a metallic plate, the metallic plate capacitively coupling to the metalized pattern via the substrate.

15. The radio-frequency identification (RFID) antenna of claim 14, further comprising a second feed line residing at a top surface of the substrate, the second feed line electrically connected with a side of the first microstrip segment.

16. A radio-frequency identification (RFID) antenna, comprising:

a substrate;

a first microstrip segment carried by the substrate;

a second microstrip segment carried by the substrate;

a lateral microstrip carried by the substrate, the lateral microstrip coupling the first microstrip segment and second microstrip segment to each other;

a third microstrip segment carried by the substrate;

a first slot situated between the first microstrip segment and the third microstrip segment;

a first open end established via the first slot between terminal ends of the first microstrip segment and the third microstrip segment;

a second slot situated between the second microstrip segment and the third microstrip segment;

a second open end established via the second slot between terminal ends of the second microstrip segment and the third microstrip segment;

a ground plane;

a shorting strip extending between the lateral microstrip and the ground plane;

a first feed line residing at a bottom surface of the substrate, the first feed line terminating at a capacitor; and a second feed line residing at a top surface of the substrate;

wherein, in a first mode of use, a first electromagnetic field radiates from the first slot and from the second slot, and, in a second mode of use, a second electromagnetic field radiates adjacent the terminal ends of the first, second, and third microstrip segments.

17. The radio-frequency identification (RFID) antenna of claim 16, further comprising a longitudinal spacing situated between the lateral microstrip and the third microstrip segment, wherein at least one section of the first feed line overlaps with the longitudinal spacing, and wherein the second feed line is electrically connected with a side of the first microstrip segment.

18. The radio-frequency identification (RFID) antenna of claim 16, wherein a feed connection communicates with the first feed line and with the second feed line, the feed connection situated at the substrate and being positioned laterally outside of the first microstrip segment so as not to overlap the first, second, and third microstrip segments.

* * * * *